April 25, 1967 C. G. SVALA 3,316,354
FULL ALTERNATE ROUTE AUTOMATIC COMMUNICATION SYSTEM
Filed Oct. 4, 1963 9 Sheets-Sheet 1
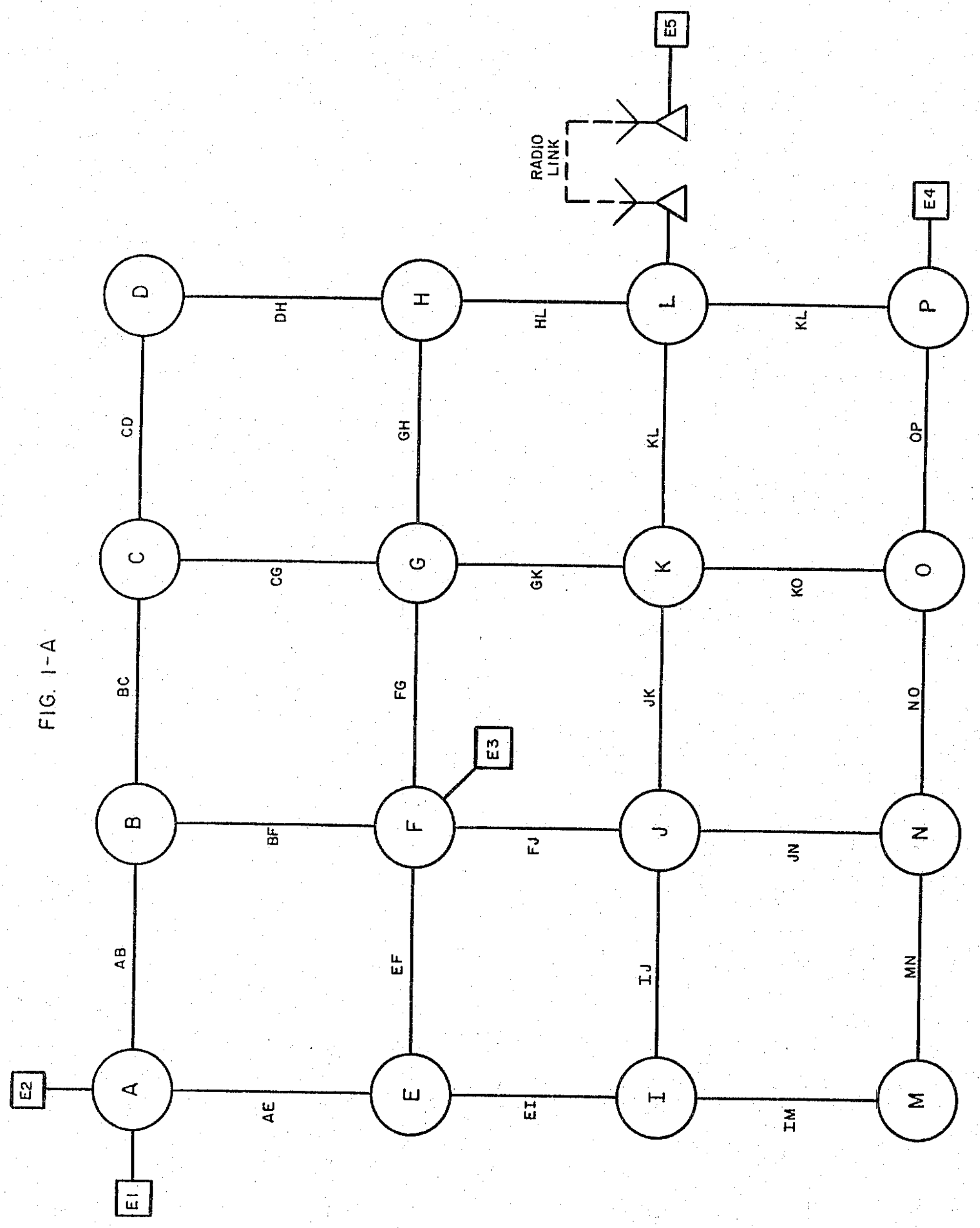
FIG. 1-A
INVENTOR.
CARL GUNNAR SVALA
BY Brown, Jackson, Boettcher & Dienner INVENTOR.
CARL GUNNAR SVALA
BY
Brown Jackson Boettcher & Dienner FIG. 1 M CALL FROM E1 TO E4
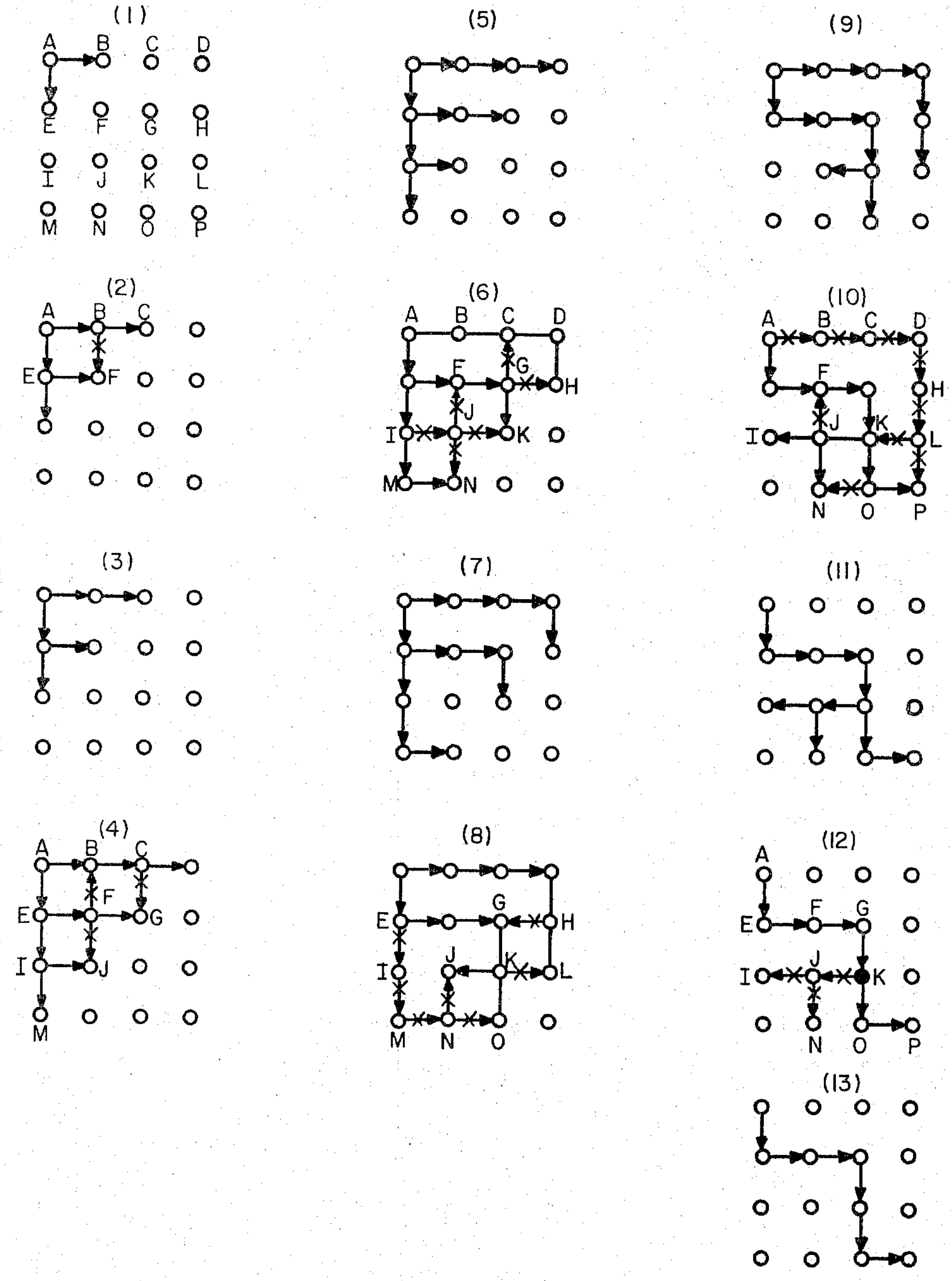
INVENTOR.
CARL GUNNAR SVALA
BY Brown, Jackson, Boettcher & Dienner FULL ALTERNATE ROUTE AUTOMATIC COMMUNICATION SYSTEM
Filed Oct. 4, 1963
FIG. 1-N CALL TO UNASSIGNED NUMBER
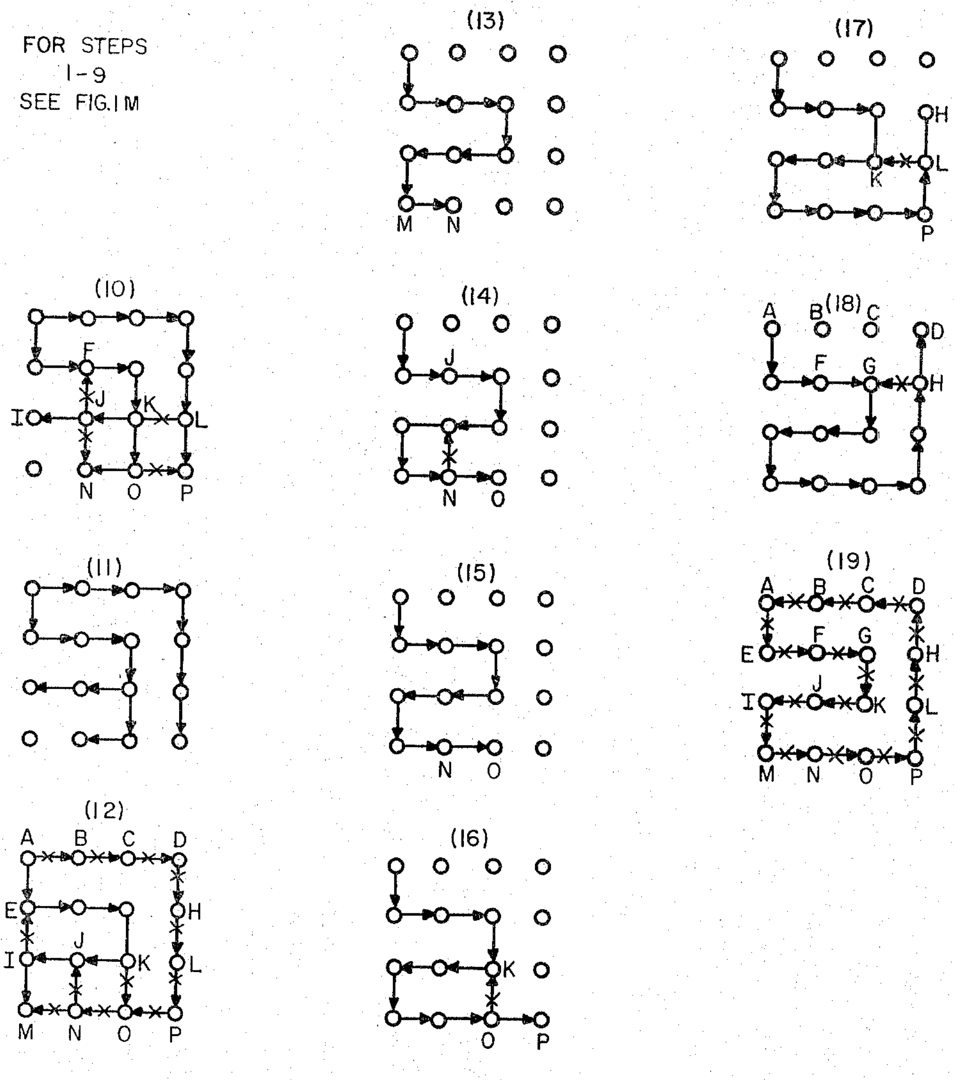
INVENTOR.
CARL GUNNAR SVALA
BY Brown Jackson Boettcher & Dienner FIG. 1-"O" CALL FROM E1 TO E4
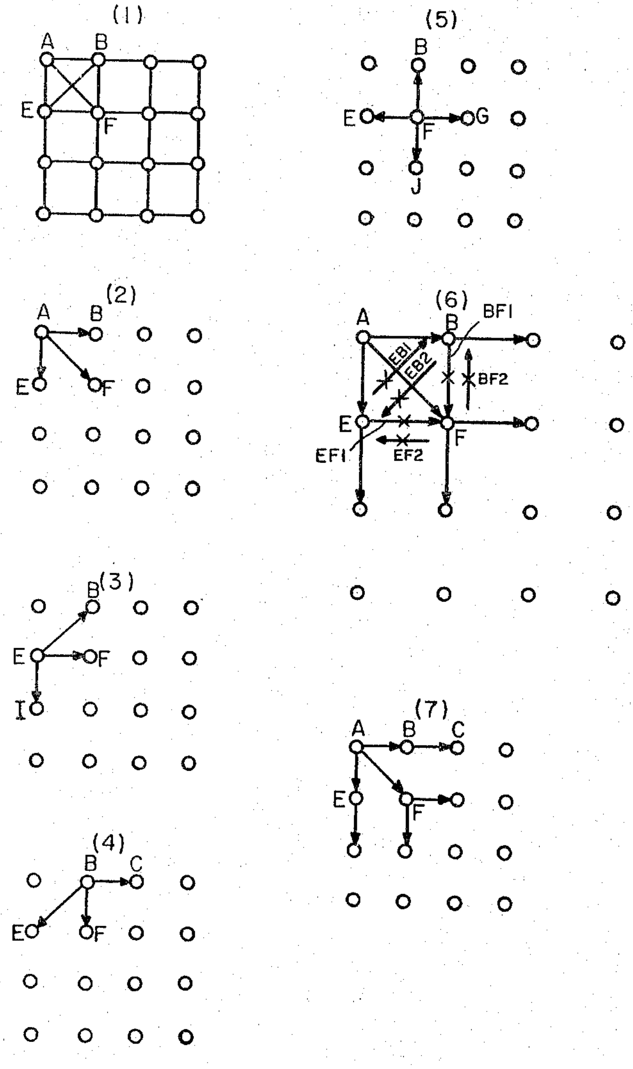
INVENTOR.
CARL GUNNAR SVALA
BY Brown Jackson Boettcher & Dienner

LOCAL TO TRUNK

INVENTOR.
CARL GUNNAR SVALA
BY Brown Jackson Boettcher & Dienner

April 25, 1967 C. G. SVALA 3,316,354

FULL ALTERNATE ROUTE AUTOMATIC COMMUNICATION SYSTEM

Filed Oct. 4, 1963 9 Sheets-Sheet 7

TRUNK TO TRUNK

INVENTOR
CARL GUNNAR SVALA

BY Brown Jackson Boettcher & Dienner

INVENTOR.
CARL GUNNAR SVALA
BY
Brown, Jackson, Boettcher & Dienner

April 25, 1967 C. G. SVALA 3,316,354

FULL ALTERNATE ROUTE AUTOMATIC COMMUNICATION SYSTEM

Filed Oct. 4, 1963 9 Sheets-Sheet 9

SCRATCH PAD MEMORY, A-MEMORY, B-MEMORY

INVENTOR.
CARL GUNNAR SVALA

BY Brown, Jackson, Boettcher & Dienner 3,316,354

FULL ALTERNATE ROUTE AUTOMATIC COMMUNICATION SYSTEM

Carl Gunnar Svala, Galion, Ohio, assignor to North Electric Company, Galion, Ohio, a corporation of Ohio Filed Oct. 4, 1963, Ser. No. 314,027
16 Claims. (Cl. 179—18)

This invention relates to communication systems, and more particularly to communication systems incorporating equipment which automatically effects alternate routing of calls to any address in the system.

Many arrangements of alternate routing for communication systems, and particularly telephone systems having central offices connected by groups of trunks or channels, have been proposed and attempted heretofore. However, most conventional systems have not been able to capitalize to the fullest extent on the capabilities of alternate routing due to certain inherent limitations in the proposed arrangements.

Recently a new exceptional approach to alternate routing, identified in the art as "Saturation Signalling," has been made, one embodiment of which is set forth in U.S. Patent 3,111,559, which issued Nov. 19, 1963. A saturation signalling system basically comprises a communication network having a plurality of automatic central offices interconnected by groups of communication channels. The term "Saturation Signalling" itself refers to the method and means used in locating a called office or party in a system of such type.

A saturation signalling system can be further characterized as a system in which (1) There is no central control of the network; (2) There is a unique address for each destination of the system; (3) The called station can be reached without the calling station or calling office having knowledge of the location in the system of the called station (in a security system, this feature is of considerable value); (4) A call spreads through the system over available paths between offices until it reaches its destination, redundant being released.

In operation, briefly, when a trunk call is placed in a network which uses saturation signalling, the called address of the desired station is propagated from the originating office over a channel, if available, in every outgoing route to each office connected thereto. Such manner of propagation is repeated at each office over a channel, if available, in every route except the incoming route until the office including the station having the propagated called address is reached.

When the destination office is reached a connecting path is "locked-in" between the originating office and the destination office by a reverting signal. The reverting signal effects the release of redundant branches as it progresses back toward the originating office.

It will be apparent that saturation signalling provides many advantages, a few of which include:

(1) Standardization of design and structure of automatic central offices.

(2) A more practical use of the alternate routing principle as all channels in the system are eligible to handle any call.

(3) Automatic selection of the available route which requires the least amount of connection time.

(4) Register equipment at the central office of a more simple construction, since the central office is not required to store information which relates to the configuration of the network as a whole, or as to the connection of stations at other central offices.

(5) A system having a high degree of flexibility in the field. For example, if a station transfers from one central office to another, it is only necessary to erase the address from the one central office and write it in the memory of the other, with no change in the common system printed directory. If a called office is deleted, it is only necessary to delete the stations associated therewith from the system directory or to write them in the memory of some other existing station. If a new station is added to the system, it is only necessary to write the associated station addresses in its memory and add them to the common system directory. Also, if a central office with its associated stations is moved to a different geographical location in the system, no change in the other central offices is necessary.

(6) A system which is compatible with high speed switching.

While these advantages reside in the saturation signaling system, the present invention reduces the traffic load due to search traffic as faster and more efficient release of redundant signaling paths is effected. This reduces the amount of switching equipment such as registers in the central offices and, indirectly, provides a degree of improvement in the speed of search in a saturation signaling network as the number of routes found busy will be reduced. It is an object of the present invention to provide a novel system and method which is operative in this improved manner.

It is another object of the present invention to provide a system which is so operative, and which specifically includes control means for spreading calls and releasing redundant paths in a more efficient manner.

It is a specific object of the invention to provide a system of such type which includes means in each office for releasing an incoming path having a call if no outgoing path extends a call from such office.

It is yet another object of the invention to provide means in each office which are operative to automatically release an incoming channel over which a call is received whenever there is no available idle channel in any outgoing path.

It is yet another object of the invention to provide means in each office operative to automatically release an incoming channel over which a call is received wherever all outgoing channels handling the same call from a central office become released.

It is a further object of the invention to provide means in each office operative to automatically release an incoming channel over which a call is received whenever all trunks in certain routes are busy, and the call is extended over other routes which are then released.

Another object of the invention is to provide a system including means in each central office for automatically releasing a channel over which a call arrives in an office for a called address which is the same called address as of another call in progress in the office, said system being operative in forwarding of a call to an unassigned number to continue the call forwarding to the originating station and the release of all of the routes used in the forwarding of the call.

These and other objects of the present invention, and its various features and advantages, will appear more fully upon consideration of the accompanying description and drawings, in which:

FIGURE 1A is a block diagram of the general system;

FIGURE 1M illustrates the manner of spread of a call and release of redundant channels in a grid-mesh configuration of offices;

FIGURE 1N illustrates the manner of spread of a call and release of channels to an unassigned number in a grid-mesh configuration of offices;

Figure 2:
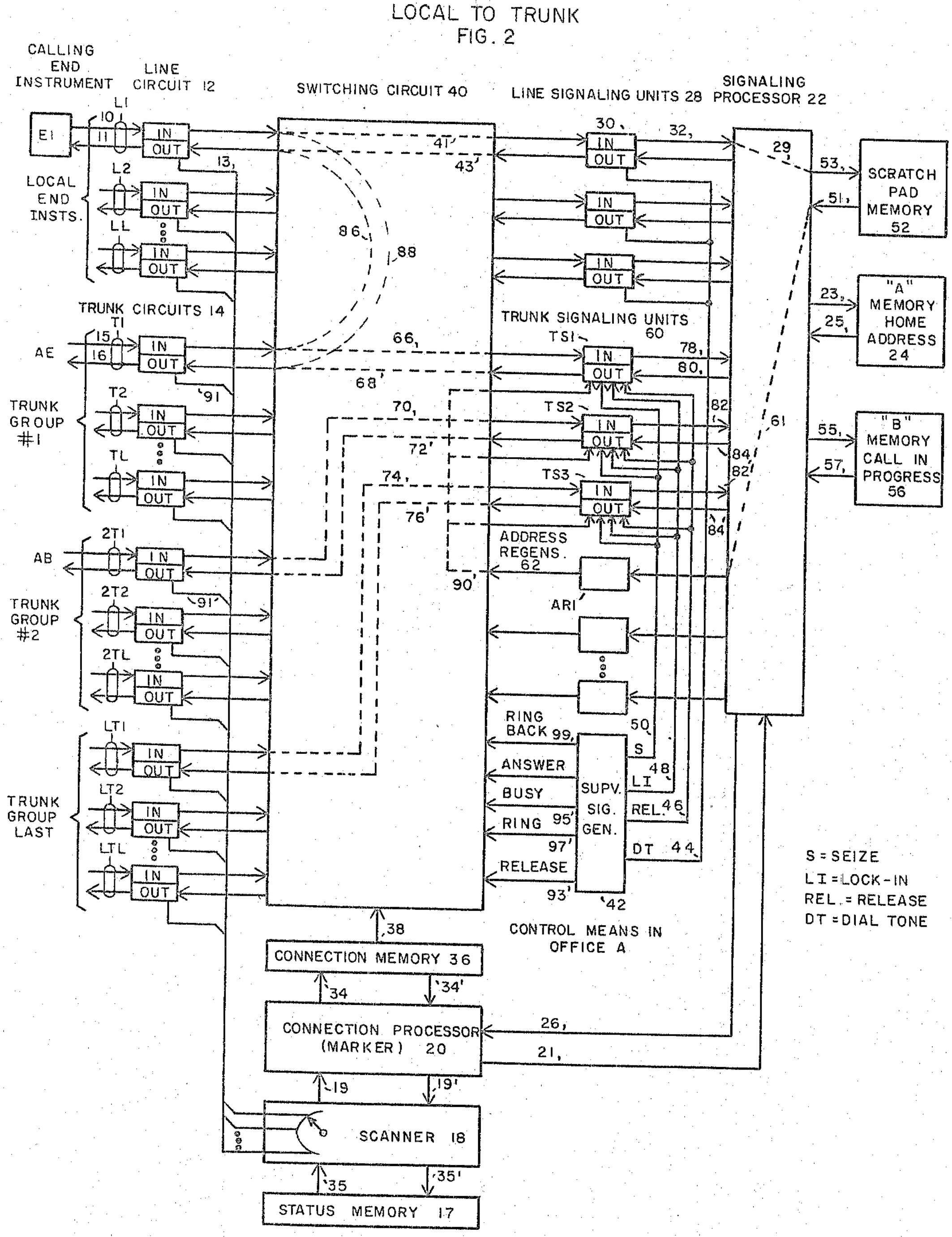
Figure 3:
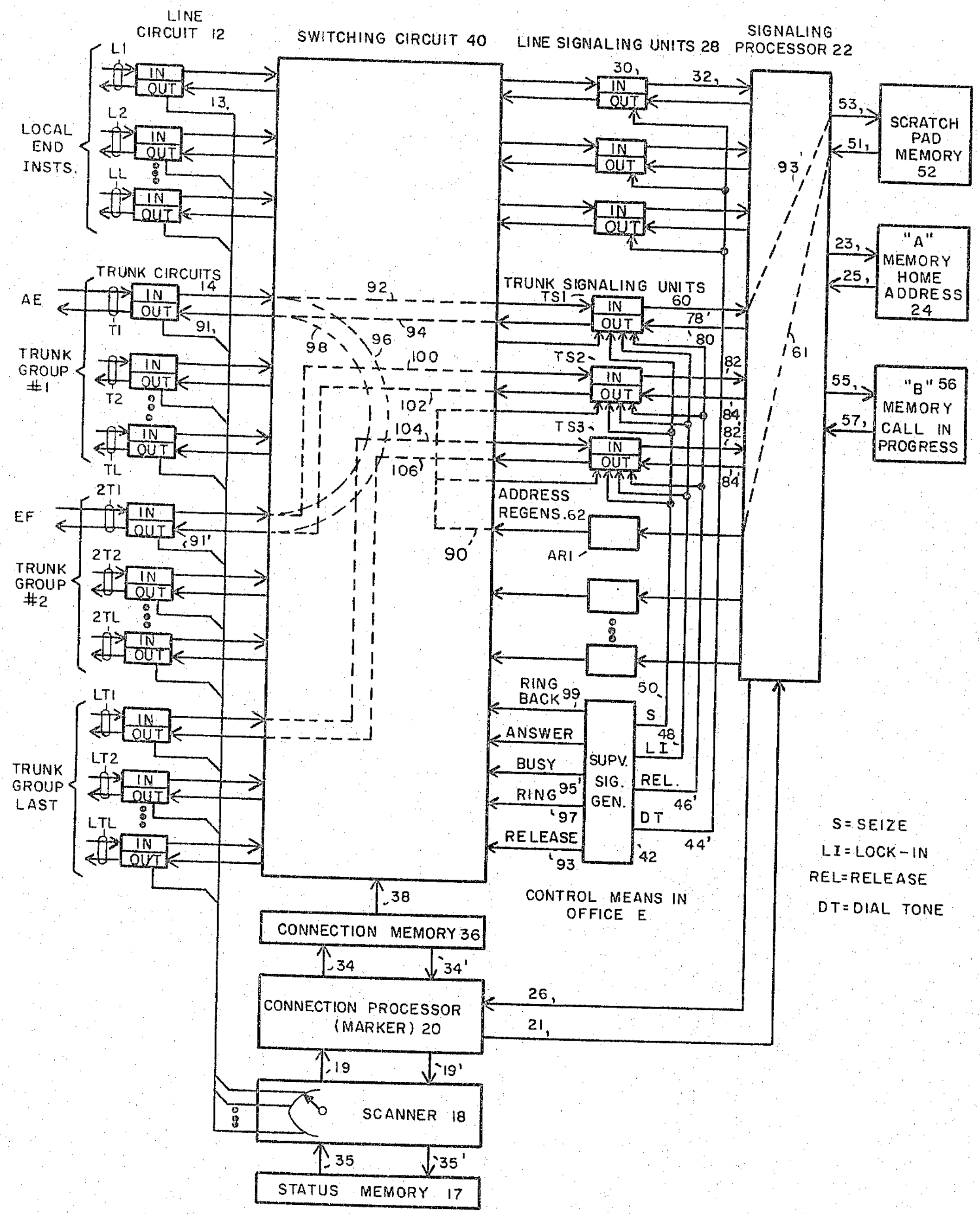
Figure 4:
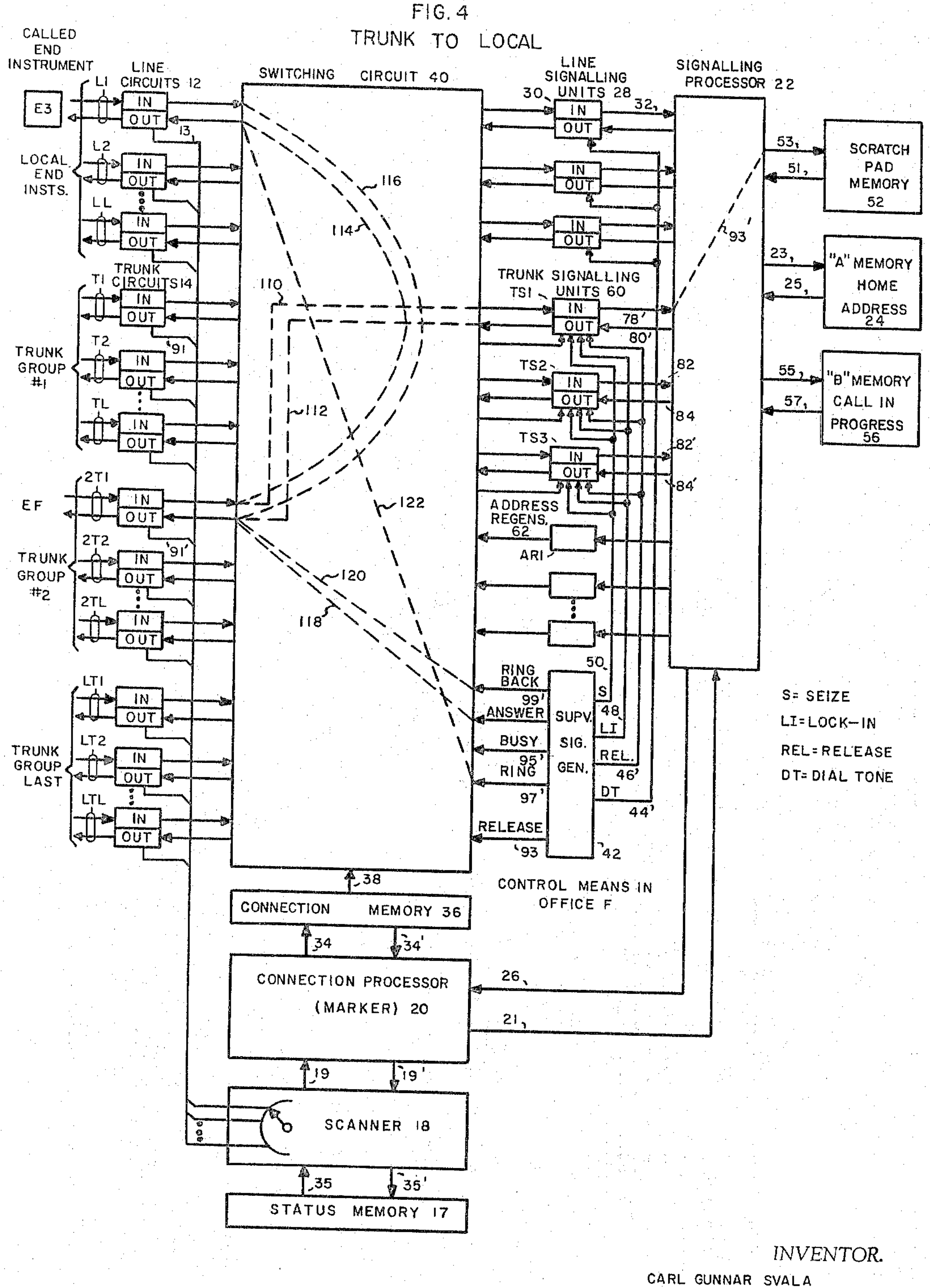
Figure 5:
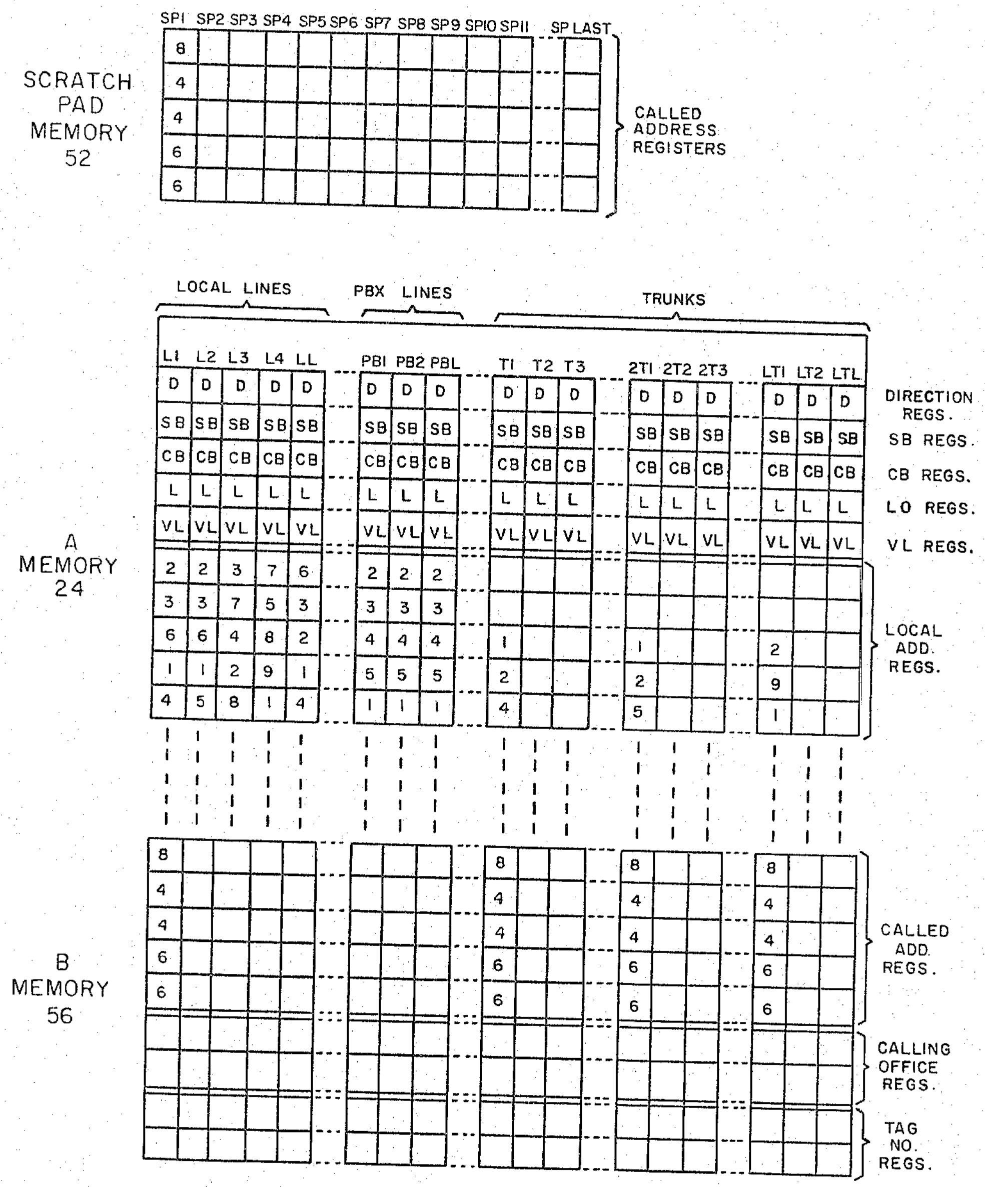

FIGURE 1 "O" illustrates the manner of spread of a call and release of redundant channels in a combination grid-mesh, polygonal configuration;

FIGURE 2 illustrates a central office, and the switching equipment used in a local to trunk call;

FIGURE 3 illustrates a central office, and the switching equipment used in a trunk to trunk call;

FIGURE 4 illustrates a central office, and the switching equipment used in a trunk to local call; and FIGURE 5 illustrates in more detail the memory system of each central office.

BRIEF DESCRIPTION OF SATURATION SIGNALLING SYSTEM

In the novel mode of operation of the saturation signalling network set forth hereinafter, a calling end instrument sends a called station address to its central office. The central office compares the called address with the addresses found in a first memory (A memory) to determine whether or not the called station is connected to the central office. It further compares the called address with the addresses in a second memory (B memory) to determine whether or not a call to the called address is in progress in the central office.

Assuming that the called address is not found in the A-memory or B-memory, the calling office selects an idle trunk (channel), if available, in each outgoing route which it has to other central offices, and repeatedly sends the called address over each of said available outgoing channels.

Each time one of these other central offices receives the called address over an incoming channel it is retransmitted over an idle trunk, if available, in each outgoing route therefrom, except the route over which the address was received, to each central office which is connected thereto. This procedure continues until the destination office is reached.

It is obvious that with a spread of this nature, a collision may occur at a central office between calls from the same source. Further, a collision may occur as the result of two calls from different sources to the same called address. In any collision, the last call to arrive at the point of collision loses. Furthermore, if two calls to the same address arrive at the same time at a central office, the first call picked up by the scanner will receive precedence. At least two receptions of the called office code over a given channel to a central office are received and compared, before the central office will allow the called address to remain in a third memory (the "Scratch Pad" Memory).

When the call arrives at the destination office, and the equipment thereat detects the called address in its first memory (the A memory for local addresses) but not in its second memory ("call-in-progress" B-memory), it repeatedly sends a Lock-In signal back over the selected path to the next preceding office which causes any redundant trunks associated therewith to be released.

This office in turn "cuts-through," allowing the Lock-In signal to progress backward to the next preceding office which releases any redundant trunks associated therewith and "cuts-through." Such procedure repeats through the offices until the Lock-In signal reaches the calling office over the established path.

The calling office then sends a Lock-In signal as the Lock-In Verification signal over the established path to the terminating office which terminates transmission of the Lock-In signal and signals (rings) the called station.

When the called station answers, the terminating office "cuts-through" from the incoming trunk to the called line and communication ensues.

As will be shown hereinafter, if calls to the same destination arrive at a central office over more than one channel, the automatic release of the channel or channels over which the call to the same destination arrives in a central office after the first to arrive, constitutes an important feature in effecting the release of redundant calls in the network, and a more efficient operation of the equipment.

A further improvement in release of redundant paths in the network is achieved by automatically releasing the incoming channel carrying a call to an office whenever each of the outgoing channels carrying the call from the office become released or if all outgoing routes are busy or if each outgoing channel is indicated as busy or released.

It should be observed that with the called address repeatedly sent by the calling office rather than being independently regenerated at tandem offices (1) there is less chance of error; (2) spreading of the call is terminated when the Lock-In signal is received; and (3) the tandem offices do not have to request re-transmission in case the address has not been received clearly.

While the spread of a call in the detailed illustrations which appear hereinafter is traced from a boundary office to a boundary office, it will be understood that the same principles apply for the spread of a call from a non-boundary office to a boundary office, for the spread of a call from a non-boundary office to a non-boundary office, and for the spread of a call from a boundary office to a non-boundary office.

GENERAL DESCRIPTION OF A TELEPHONE SYSTEM OPERATING WITH SATURATION SIGNALLING TECHNIQUES

A telephone system connected to operate in accordance with the novel saturation signalling techniques of the invention is shown in schematic form in FIGURE 1A. As there shown, the exemplary network includes sixteen central offices connected in a grid-mesh configuration, each of which is represented by a circle and each of which is designated alphabetically from A to P. Additionally, the various offices are interconnected by routes or paths, such as path AB, which extends between offices A and B, each of which paths comprises one or more trunks or channels which may be two-way trunks having the capability of signalling in both directions simultaneously or sequentially. In the exemplary embodiment set forth herein, each path is assumed to have a plurality of trunks.

Each central office has associated therewith a group of stations, each of which has its own unique address relative to the whole network. It should be understood that each central office has many stations associated therewith, and that the stations may be telephones or end instruments of various kinds including data transmitting instruments. For illustrative purposes, stations which may comprise end instruments E1 and E2 are shown as rectangles connected to central office A; end instrument E3 is shown connected to central office F; end instrument E4 is shown connected to central office P; and end instrument E5 is shown connected by a radio link to central office L.

The manner in which connections are established between central offices, such as A and P, on end instruments E1 to E4, for example, will be set forth hereinafter. However, as an aid to an understanding of the description of the manner in which calls are extended through the network of FIGURE 1A, the description first sets forth, by way of example, different configurations in FIGURES 1B–1H which use the principles involved, in calls through networks containing a lesser number of offices.

Figure 1B:
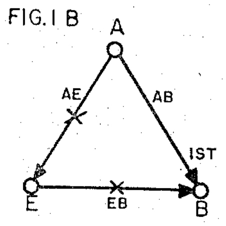
FIGURES 1B and 1C illustrate the manner of spread of calls and release of redundant channels in a simple system involving only three offices.

More specifically, with reference to FIGURE 1B three offices A, B, and E are shown in a triangular pattern, which could exist in a network adapted for saturation signalling. In such example, offices A and B are connected by a path AB comprising a first group of trunks; offices A and E are connected by a path AE comprising a second group of trunks; and offices E and B are connected by a path comprising a third group of trunks. Assuming that a station connected to office A goes "off-hook" and "dials" or sends to office A the address of a station associated with office B, the equipment at office A in turn transmits the called address over an idle channel in each of the paths AB and AE to offices B and E respectively. Office E in turn transmits the called address over an idle channel in path BE to the office B.

The legend "1st" indicates that the call arrived in office B over the channel path AB, and then later arrived over the trunks in paths AE and BE. The legend "x" indicates that the trunks or channels in path AE and BE over which the call was later received are released.

Figure 1C:
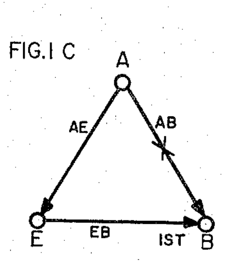

With reference to FIGURE 1C, an alternative set of paths which might be selected for establishing a call from A to B is shown thereat. As there shown, the legend "1st" indicates that the call first arrived at office B over channels in path AE and BE and the "x" indicates that the channel in path AB over which the call arrived later, is consequently released. This is only likely in case all trunks are busy in path AB.

Figure 1D:
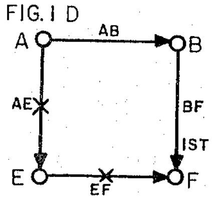
FIGURES 1D and 1E illustrate the manner of spread of calls and release of redundant channels in a simple system involving four offices in a grid configuration.
Figure 1E:
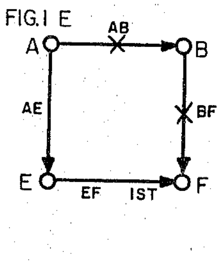

Further exemplary patterns are shown in FIGURES 1D and 1E. Referring now to FIGURE 1D, and assuming that a local station has transmitted to office A, the address of a station in office F, which is designated the called office, the equipment in office A sends the called address over an idle channel in path AB to office B and over an idle channel in path AE to office E. (To simplify the disclosure the statement that office A sends the address over channels AB and AE will imply that the address is transmitted over idle channels in paths AB and AE.) Office B sends the address over channel BF to office F; and office E sends the address over channel EF to office F.

Assuming as shown that the call arrives first in office F over channels AB and BF, channels AE and EF will be released ("x"). An alternative set of paths which might be selected for establishing a call from office A to office F is shown in FIGURE 1E. As there shown, if the call from office A to office F arrives over channels AE and EF first, channels AB and BF will be released.

Figure 1F:
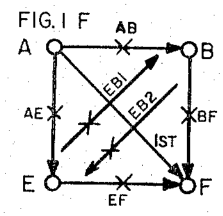
FIGURES 1F–1H illustrate the manner of spread of calls and release of redundant channels in a simple polygonal configuration of four offices.
Figure 1G:
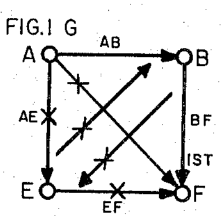
Figure 1H:
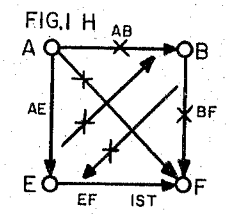

The manner in which calls progress in a polygonal network is shown in an elementary network of this type in FIGURES 1F, 1G, 1H.

With reference first, to FIGURE 1F, four offices A, B, E, and F are shown thereat, and it is assumed that groups of channels between offices exist in a polygonal configuration as follows:

AB, BF, EF, AE, AF, and EB

Assuming that a local station has transmitted to office A the address of a station in office F, office A sends the called address over channels AB, AF, and AE to offices B, F, and E respectively.

Office E sends the called address over an idle channel in each of paths EB and EF to offices B and F respectively. Office B sends the called address over an idle channel in each of paths BE and BF to office F.

Assuming that the call arrives in office B over channel AB before it arrives over channel EB1, channel EB1 will be released as shown. Assuming that the call arrives in office E over channel AE before it arrives over channel EB2, channel EB2 will be released as shown.

Assuming that the call arrives in office F first over channel AF, channels AB and BF will be released in one route, BF, then AB; and channels AE and EF will be released in another route, EF, then AE. The only connection left in such switching sequence will be the path over channel AF.

Referring to the polygonal network of FIGURE 1G, a call from office A to office F with channels EB1 and EB2 released as in FIGURE 1F is assumed. However, if the call arrives in office F first over the path comprising channels AB and BF, one path comprising channel AF will be released, and another path comprising channels AE and EF will be released, EF, then AE. The only connection between A and F will be the path over channels AB and BF.

Referring to the polygonal network of FIGURE 1H, a call from A to F with channels EB1 and EB2 released as in FIGURE 1F is assumed. If the call now arrives in office F first over the path comprising channels AE and EF, one path comprising channel AF will be released, and another path comprising channels AB and BF will be released. The only connection between A and F will be the path over channels AE and EF.

Many other patterns will, of course, be obvious to parties skilled in the art, and the foregoing are merely examples of a few of the many possible patterns which mav occur.

*Call from station E1 to station E4*

With this general background of certain of the principles of saturation signalling, reference is now made to FIGURE 1A and the manner in which a call may be attempted over a number of paths from a calling station, such as end instrument E1, to a called station, such as end instrument E4. Assuming that end instrument E1 (referred to as station E1) goes "off-hook," to initiate a call to station E4, a scanner in office A detects the off-hook condition, whereupon office A sends dial tone or a start signal to station E1. With the receipt of that tone, station E1 "dials" or sends to office A, the address of station E4, which may be a five digit number unique in the system to station E4.

Office A consults its A memory (described more fully hereinafter and shown in FIGURE 5) to determine whether or not the called station, as represented by the called address, is associated with (i.e., connected to) office A. If it were, office A would complete the call locally.

As the address of office E4 is not found in the A part of its memory, office A further consults its B memory to determine whether the address of station E4 is therein (i.e., to see if some other call through office A to station E4 is in progress).

Assuming that no other call through office A is in progress to office E4, office A selects an idle trunk in each of the paths AB and AE and transmits the address of E4 over these trunks to offices B and E respectively. Since the spread of this call and the release of redundant channels comprises an important feature of the invention, exemplary steps thereof have been set forth in FIGURE 1M along with FIGURE 1A. It will be apparent that the designations of the sixteen offices shown by reduced size circles in FIGURE 1M, and the paths comprising the groups of channels are those represented in FIGURE 1A, the reduced size being provided to simplify the disclosure of one spread pattern which might occur for a given set of conditions.

With reference now to FIGURE 1M, one possible sequence of steps in the spread of a connection from office A toward office P in the establishment of a call from end instrument E1 to end instrument E4, is shown thereat and is described as follows:

(1) Office A transmits the call over channels AB and AE to offices B and E respectively.

(2) Office B transmits the call over channels BC and BF to offices C and F respectively. Office E transmits the call over channels EF and EI to offices F and I respectively. The call arrives in office F over channel EF before it arrives over channel BF. The arrival of a call at an office over two different paths is identified hereinafter as a "collision."

As a result of the collision, channel BF, over which the call arrived last at office F, is released. (Actually, as the call over channel EF arrived at office F first, office F may succeed in sending a call over a channel in the direction of office B before the call from office B arrived over channel BF. When this call from office F, in the direction of office B arrives at office B, it will collide with the call over channel AB, which is assumed to have arrived at office B first. Accordingly, this call from office F to office B will be released and has not been indicated in FIGURE 1M (2) for the purpose of simplifying the schematic showing.)

(3) The advance of the call thus far is shown in this figure for clarity of understanding.

(4) Office I sends the call to offices J and M. Office F sends the call to offices B, J and G. Office C sends the call to offices D and G. Channel FJ is assumed, in this example, to lose in the collision between FJ and IJ. Channel CG loses in the collision between CG and FG. Since the call was previously established over channel AB the call over channel BF arrives later and is therefore released.

(5) The advance of the call thus far with the released paths omitted is shown hereat.

(6) Office M sends the call to office N. Office J sends the call to offices N and K. Office G sends the call to offices C, K and H. Office D sends the call to office H.

In the present example, channel JN loses in the collision between JN and MN; channel JK loses in the collision between GK and JK; channel GH loses in the collision between GH and DH.

Because all outgoing channels which were carrying the call for office J (JF, JK, and JN) are released, incoming channel IJ becomes released. Channel CG becomes released because the call collides with the call over channel BC which arrived at C first.

(7) The advance of the call thus far with the released paths omitted is shown.

(8) Office N sends the call to office, J and O. Office K sends the call to offices J, O, and L. Office H sends the call to offices L and G.

In this example, it is assumed that channel GH collides with the call at office G and is released; channel KL loses in the collision between KL and GK; channel JN loses in the collision between JN and JK; channel NO loses in the collision between NO and KO.

Since all outgoing channels of office N are released (JN and NO), incoming channel MN for office N becomes released.

In that all outgoing channels from office M handling the call (i.e., channel MN) are released, incoming channel IM becomes released.

Because all outgoing channels from I handling the call are released, incoming channel EI becomes released.

(9) Shows the advance of the call thus far with the released paths omitted.

(10) Office J sends the call to offices F, I, and N. Office L sends the call to offices N and P. Office L sends the call to offices K and P.

In the given example, channel FJ collides with the call at office F and is released; channel NO loses in the collision between NO and JN; channel KL collides with the call at office K; and channel LP loses in the collision between LP and OP.

Since all outgoing channels of office L are released (KL and LP), incoming channel HL becomes released.

In a similar manner, channels DH, CD, BC, and AB become released.

(11) The net advance of the call thus far with the released paths omitted is shown.

(12) As the called address reaches office P, office P finds this address in its A memory (because called station E4 is associated therewith) and as a result thereof, office P repeatedly sends the lock-in signal back over the incoming channel OP.

The lock-in signal is received in office O which "cuts-thru," whereupon the lock-in signal passes back over channel KO to office K. Upon receipt of this lock-in signal, office K releases all outgoing channels (i.e., JK) handling the call except the outgoing channel over which the lock-in signal was received (i.e., KO). With the channel JK incoming to office J released, office J releases all outgoing channels handling the call (i.e., IJ and JN). Office K "cuts-thru" and the lock-in signal progresses backward to office G and in turn F and E to originating office A.

Thereupon, office A sends the lock-in signal, which constitutes the lock-in verification signal, forward over the established path to office P. Upon receipt of this verification signal, office P ceases the sending of the lock-in signal, signals the called station, and sends the "ring-back" signal over the connection to the calling station at office A. When the called station goes off-hook in answering the call signal, office P sends a short burst of "answer signal" over the connection to the calling station and "cuts-thru" to the called station.

If the called station is found to be busy, office P after having received lock-in vertification, sends the release signal (which is a timed signal) back over the established connections. As all of the previous offices have "cut-thru," each of the trunk circuits will receive this signal simultaneously. After having received this signal for the required timed period, each of the previous offices will release.

(13) The established path of the call with the released paths omitted is shown in FIGURE 13.

CALL TO UNASSIGNED NUMBER

In the provision of a saturation signalling network, it is important that no switching center shall process the same call twice in order to prevent "ring-around-the-rosey" switching. As an example, if this were not the case, in the event that an unassigned number were dialled, after a switching center or office discontinues the call, it could make a call to that destination again. This call might be the same call as was previously handled and is now arriving by a different route. According to a novel concept of this invention, the basic principles employed are operative to prevent such manner of operation and in fact to effect release of the call without resorting to the use of time-out equipment. Stated in another manner, a call to an unassigned number will spread through the network, and back to the originating office (i.e., the head bites its tails), and automatically releases the call to the unassigned number.

Referring now to FIGURE 1N, an exemplary call made by a station, such as E1, at office A to an "address" (i.e., a five digit number for example) not assigned to any existing station is traced in one of a number of possible spreads.

(1–9) Since steps 1–9 can be the same as just described in the spread of a call from E1 to E4, the patterns are not retraced.

(10) Office J sends the call to offices F, I, and N. Office O sends the call to offices N and P. Office L sends the call to offices K and P.

As an example, channel FJ collides with the call at office F and becomes released; channel JN loses in the collision between JN and NO; channel KL collides with the call at office K and becomes released, and channel OP loses in the collision between OP and LP.

(11) The advance of the call thus far is set forth with the released paths omitted.

(12) Office I sends calls to offices E and M. Office N sends calls to offices M and J. Office P sends a call to office O.

As an example, channel EI collides with the call at office E and becomes released; channel JN collides with the call at office J and becomes released; channel OP collides with the call at office O and becomes released; and channel MN loses in the collision between MN and IM.

As outgoing channels JN and MN are released, incoming channel NO also becomes released. As outgoing channel NO is released, incoming channel KO also becomes released. When outgoing channel OP becomes released, incoming channel LP also was released. This release spreads backward over channels HL, DH, CD, BC and AB.

(13) The spread of the call thus far, plus the call sent by office M to office N is shown hereat.

(14) Office N sends the call to offices J and O. Channel JN collides with the call at office J and is released.

(15) The net spread of the call is illustrated herein.

(16) Office O sends the call to offices K and P. Channel KO collides with the call at office K and is relased.

(17) Office P sends the call to office L. Office L sends the call to offices K and H. Channel KL collides with the call at office K and is released.

(18) Office H sends the call to offices G and D. Channel GH collides with the call at office G and is released. In similar fashion, though not shown in additional schematics, office D sends the call to office C, and office C sends the call to offices B and G. Channel CG collides with the call at office G and is released. Office B then sends the call to offices A and F, and channel BF collides with the call at office F and is released.

(19) Channel AB collides with the call at office A and is released. Because all outgoing channels handling the call at office B are released, the channel BC incoming to B is released. Because all outgoing channels handling the call at office C are released, the channel CD incoming to office C is released. This release procedure spreads back over channels DH, HL, LP, PO, ON, NM, MI, IJ, JK, KG, GF, FE and EA until the call is completely released and office A remains with no channels therefrom handling the call.

ANOTHER CALL INVOLVING A POLYGONAL SITUATION (SEE FIG. 1–O)

In certain of the call spreads set forth hereinbefore (see FIG. 1M, for example) the network was shown in a simple grid-mesh configuration. It will be apparent that more complex configurations will be encountered in the field, and by way of illustrating the manner in which the novel system is operative in the more complex type switching networks, the initial portion of a spread in a network including a polygonal arrangement is set forth in FIGURE 1–O.

(1) Referring now to FIGURE 1–O, in the upper left corner is schematically shown a grid-mesh network of sixteen offices with paths between offices B and E forming a polygonal pattern.

(2) In spreading a call from station E1 to station E4, office A sends calls to offices E, B, and F. Although steps 3, 4, and 5 occur essentially simultaneously, in the interest of clarity, these three steps are shown separately, and the result or combined effect is shown in step 6.

(3) Office E sends calls to offices I, F, and B.

(4) Office B sends calls to offices E, F, and C.

(5) Office F sends calls to offices E, J, G, and B.

(6) For purposes of example, channel EB1 collides with the call at office B and is released; channel EB2 collides with the call at office E and is released; channel EF2 collides with the call at office E and is released, and channel BF2 collides with the call at office B and is released.

For exemplary purposes, it is assumed in the present illustration of call spread that the call arrives in office F over channel AF before it arrives over channel EF1, so channel EF1 becomes released; and that the call arrives in office F over channel AF before it arrives over channel BF1, so channel BF1 becomes released.

(7) The spread of the call with the released paths omitted is shown in FIGURE 7.

As the principles involved in the further call spread are the same as already described hereinbefore, it is not believed necessary to trace the call further.

Figure 1I:
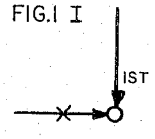
FIGURES 1I–1L illustrate in schematic form certain ones of the novel conditions of operation provided by the invention.
Figure 1J:
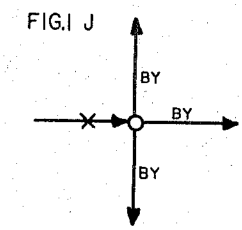
Figure 1K:
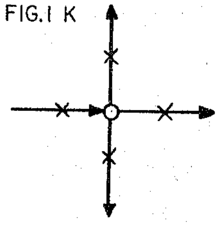
Figure 1L:
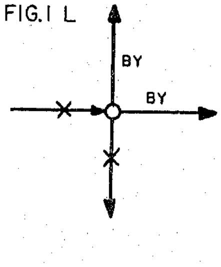

Before going into a more detailed description, we shall briefly consider FIGURES 1I to 1L which set forth certain basic principles of operation of saturation signalling, some of which were encountered in the foregoing examples. With reference to FIGURE 1I, if a call arrives at an office first over a channel in one path and later over a channel in another path, a "collision" occurs and the channel over which the call arrived last becomes released. With reference to FIGURE 1K, if all outgoing channels carrying a call become released, the incoming channel carrying the call also as a consequence becomes released. With reference to FIGURE 1J, if an incoming call over a channel to a central office cannot be extended because there is no available idle channel in any outgoing path, the incoming channel becomes released as a consequence thereof. With reference to FIGURE 1L, if an incoming call over a channel to a central office finds all channels in certain routes busy, but is extended over other routes, and if the outgoing channels handling the call become released, the incoming channel is also released.

PROCESSING OF CALLS IN AUTOMATIC CENTRAL OFFICES

With this background of the manner in which calls may spread through various network patterns, the manner of processing of calls within automatic central offices of the system to effect such manner of operation is now set forth.

First, referring again to FIGURE 1A for illustration, the establishment of a call from station E1 through office A over a channel in path AE, through office E over a channel in path EF, through office F to station E3 is now set forth. The call from station E1 through office A to a channel in path AE is identified as a "local-to-trunk" call. The call from the channel in path AE through office E to a channel in path EF is termed a "trunk-to-trunk call, and the call from the channel in path EF through F to station E3 is designated a "trunk-to-local" call.

The switching network in the various central offices as shown in FIGURES 2, 3 and 4, will best be of the fast acting electronic switching type, although the general switching pattern may be reproduced with other forms of equipment.

The switching network may operate on the space division principle and may directly receive and switch voice frequently signals and pulse code modulation signals; or, with proper demodulators and modulators may receive and switch carrier signals. The switching network may also operate on the pulse amplitude modulation time division principle and with proper modulators and demodulators may receive and switch voice frequency signals or carrier signals.

Furthermore, the switching network may operate on the pulse code modulation time division principle, and with proper encoding and decoding may receive and switch voice frequency signals or carrier signals. Also, without encoders and decoders it may directly receive and switch pulse code modulation signals, which may be encoded and decoded by the end instruments.

*Local to trunk call (FIGURE 2)*

Referring to FIGURE 2, the manner in which a local to trunk call is established through the local office A to a channel in path AE is now set forth.

(1) As the calling end instrument E1, shown in the upper left corner of FIGURE 2 goes "off-hook," an associated line circuit 12 connected to instrument E1 over paths 10, 11 of line L1 detects such condition and marks an associated conductor 13 to the scanner 18.

(2) The scanner 18 detects the off-hook condition of end instrument E1 by comparing the changed condition of the line L1 (off-hook) detected in its scan with the last registered condition of the line L1 as found in the status memory 17.

(3) The scanner 18 signals the connection processor (or marker 20) over path 19 of the detection of an off-hook condition.

(4) The connection processor 20 signals the signalling processor 22 over conductor 21 that an off-hook condition was located.

(5) The signalling processor 22 operates responsively and over path 23 marks the calling line as busy in the A memory 24.

With brief reference to the showing of FIGURE 5, the A memory 24 comprises a plurality of vertical rows of registers, any vertical row being assignable to a line, such as line L1, or a trunk, such as trunk T1, associated with the office A. Each local line, such as line L1, associated with the office, such as office A, has its five digit address recorded in its associated five digit registers in the A memory 24 as long as the line, such as L1 is associated with memory 24 in office A. Briefly stated, in the illustration of FIGURE 5, the line L1 associated with end instrument E1 has the address 23614 recorded in address memory 24. As shown in FIGURE 5, other registers are associated with each line, such as L1, including the search busy register SB, the cut-thru busy register CB, the lockout register L, the vacant line register VL, and the direction of call register D. At this time, search busy register SB marks the line 23614 as busy in the SB register; the signal processor 22 (FIGURE 2) also signals the connection processor 20 over path 26 as to the busy or idle condition of the various line signalling units 28, which information is received by the signal processor 22 over paths, such as 32 from the line signalling units 28.

(6) The connection processor 20 in response thereto (a) assigns a particular line signalling unit, such as illustrated line signalling conductor 30, to the calling line circuit 12; (b) via path 34, the connection memory 36 and path 38 to the switching circuit 40 establishes a connection between the calling line circuit 12 and the assigned line signalling unit 30 which comprises a connection 41 extending between the IN portion of the line circuit 12 and the IN portion of the line signalling unit 30; (c) signals the signalling processor 22 over path 21 to proceed.

(7) The signalling processor 22 operates and (a) signals the line signalling unit 30 to pass the dial tone signal from the DT lead 44 of the supervisory signal generator 42 via the OUT portion of the line signalling unit 30 via path 43 in the switching circuit 40 and the OUT portion of the line circuit 12 to the end instrument or station E1, whereby the station is instructed to start sending the called address; (b) connects the IN portion of the line signalling unit 30 over conductor 29 to the scratch pad memory 52.

(8) The station E1 sends the called address of station E3 (84466 in the present example) which is received a digit at a time in the line signalling unit 30, processed in the signalling processor 22, and transmitted over path 53 for storage in the scratch pad memory 52 which accumulates the successive digits of the called address in its memory equipment (see also FIG. 5).

With reference once more to FIGURE 5, the scratch pad memory contains a plurality of rows of five digit called address memories (or registers) of known structure. The line signalling units 30, signalling processor 22 and scratch pad memory 52 combination might be thought of as being operative to provide "register" functions among others, as known in conventional telephony circuitry.

(9) The signalling processor 22 operates and (a) upon receipt of the first digit "8" of the called address, signals the line signalling unit 30 to bar the dial tone signal received over conductor 44 to terminate transmission out over the connection to end instrument E1; (b) compares the called address 84466 in the scratch pad memory 52 with the addresses found in the A memory 24 and B memory 56. In that the call is not to a local address the called address will not be found in the A memory 24. Assuming that another call to the same address is not in progress, the called address will not be found in the B memory 56; (c) thereupon the signalling processor 22 (I) transmits the called address over path 55 to the B memory 56 opposite the calling address in the A memory 24 (see also FIG. 5), (II) by reference to the A memory 24 selects an idle channel, such as T1, in each outgoing path (or route, such as trunk group 1, 2, Last. If FIGURE 2 illustrates office A, the trunk group 1 might be path AE (FIGURE 1A), trunk group 2 might be path AB (FIGURE 1A, etc.). By reference again to FIGURE 5, it should be observed that each channel, such as T1, associated with an office, such as A, has a designation, which for example, may be a three digit designation, such as 124. This designation may be registered in three digit trunk registers in the A memory 24 which have SB, CB, L, VL, and D registers associated therewith. (III) Marks each selected channel, such as T1, etc., busy by means of its search busy register in the A memory 24. (IV) Places the called address in the B memory 56 opposite the selected channel addresses in the A memory (see FIGURE 5); i.e., assuming trunk T1 is one of the selected channels, the called address will be placed in the vertical column in vertical alignment with the column T1, and each of the other columns associated with the selected ones of the channels. (V) Provides the connection processor 20 over path 26 with the identity of the selected channels, such as T1; the ones of the trunk signalling units 60 which are idle and the ones of the address regenerators 62 which are idle.

(10) The connection processor 20 now (a) selects an idle trunk signalling unit, such as TS1, for each selected channel, such as T1; and also selects an idle address regenerator, such as AR1 of the group 62; (b) via path 34, the connection memory 36, path 38 and switching circuit 40 connects the selected trunk (channel) such as T1 in each outgoing path, such as trunk group 1 over a separate path, such as 66, 68, to a different idle trunk signalling unit, such as TS1. In the showing of FIGURE 2, trunk T1 of trunk group 1 for path AE (FIGURE 1A) is shown connected over path 66, 68 to idle trunk signalling unit TS1, selected trunk 2T1 in trunk group 2 to path AB is shown connected over conductors 70, 72, etc. The marker 20 signals the signal processor 22 as to the identity of the signalling units, such as TS1, and address regenerator, such as AR1 which were selected.

(11) The signalling processor now (a) connects the called address registers, such as SP1 (see FIG. 5), which contain the called address 84466 in the scratch pad memory 52 to the selected address regenerator, such as AR1, whereby the called address is available to be sent via the selected trunk signal unit, such as TS1, TS2, etc., out over the selected channels, such as T1, 2T1, etc. As office A is the originating office in this example, the signalling processor 22 allows the called address to remain in the scratch pad memory 52 so that the called address is sent repeatedly; (b) signals each of the selected trunk signalling units, such as TS1, TS2 over paths, such as 80, 84, to pass the seize signals which are repeatedly issuing from the supervisory signal generator 42 over conductor 50 to the OUT portion of the signalling units TS1, TS2, for example, and over paths 68, 72, etc. for example, and the OUT portion of the selected trunk (channel) circuits and out over the selected trunks (channels), such as T1, 2T1; (c) the seize signal is received back as the seizure acknowledge signal, over the IN portion of a trunk circuit for trunks, such as T1, 2T1, and is extended over paths 66, 70, etc., in the switching circuit 40 to the IN portion of the trunk signalling units, such as TS1, TS2. The trunk signalling units TS1, TS2, etc., signal the signalling processor 22 over paths 78, 82, etc., which signal the connection processor 20.

(12) The connection processor 20 (a) via the connection memory 36 and switching network 40 connects the selected address regenerator 62 to the trunk signalling units TS1, TS2, etc., over which the seize acknowledge signal was received.

(13) If the seize acknowledge signal is not received back over a given trunk, such as T1, etc., the signalling processor 22 signals the connection processor 20 which via the connection memory 36 and the switching circuit 40 disconnects the trunk circuit from its associated trunk signalling unit. The inoperable trunk is placed on lock-out.

(14) Thereupon, the scanner 18 monitors the calling circuit, such as line circuit 12, for line L1 in the present example for disconnect, and the called trunks, such as T1, are monitored via the trunk signalling units, such as TS1, TS2 for the lock-in signal or the release signal.

(15) If the lock-in signal is received back over the IN-part of the trunk circuit for the outgoing trunk T1, for example, the signal is transmitted over path 66 to the IN-part of the trunk signalling unit TS1 which, in turn, effects transmission of a signal over path 78 to the signalling processor 22 which (a) over path 53 erases the called number, such as 84466, from the scratch pad memory 52 and disconnects the scratch pad memory 52; (b) signals the trunk signalling unit TS1 which received the lock-in signal over the associated trunk, such as T1 (indicating that the called address has been found) to return the lock-in verification signal back over the trunk T1 by passing the lock-in signal from the supervisory signal generator 42 over conductor 48 and the OUT portion of the trunk TS1, path 68, the OUT portion of trunk circuit for trunk T1 and out over the trunk T1; (c) signals all trunk signalling units, such as TS2, TS3, associated with the call (except the trunk signalling unit TS1 which received the lock-in signal) to pass the release signal provided by supervisory signal generator 42 over path 46 in a repeated manner over the OUT-portion of each trunk signalling unit TS2, TS3 which did not receive the lock-in signal (and which were used in the saturation signalling operation), over paths, such as 72, 76 and the OUT-portion of the trunk circuit for the trunks involved, such as 2T1, LT1; (d) signals the marker 20 over path 26 of the release signal transmission. Operation of the equipment to release all paths used in an office in a call spread except the path which received the lock-in signal is in accordance with the operation set forth in the application identified hereinbefore.

(16) As a result of such signalling, the signal processor 22, marker 20, through memory 36 and switching circuit 40, effects disconnect of the address regenerator, such as AR1, involved in the call from the outgoing trunk signalling units, such as TS1, TS2, etc., which were involved in the call.

(17) As the release signal is received back over the trunks, such as 2T1, LT1 as a release verification signal, the trunk signalling unit, such as TS2, TS3 associated therewith for the call transmits a signal over associated paths, such as 82, to the signalling processor 22.

(18) The signalling processor 22 is response to such signal (a) over path 55 effects erasure of the called address in the B memory 56 for each trunk which is being released (2T1, LT1 in the present example); (b) signals the trunk signalling units TS2, TS3 to cease transmission of the release signal provided by generator 42 and conductor 46 for transmission over paths 72, 76, and the associated trunks 2T1, LT1, respectively; (c) signals marker 20 over path 26 to indicate termination of the release signal transmission.

(19) The marker 20 in response to such signalling (a) through memory 36 and switching network 40 disconnects the trunk signalling units, such as TS2, TS3 over which release verification is received from their associated trunks, such as 2T1, LT1, with which they were connected during the spread of the call; (b) transmits a signal over path 21 to the signal processor 22 to indicate disconnect.

(20) The signal processor 22 transmits a signal over path 23 to the A memory home address circuit 24 to remove the marking from the search busy register SB in the A memory 24 which indicates that the trunks 2T1, LT1 were in use, making the trunks available for a new call.

(21) With termination of receipt of the lock-in signal by trunk signalling unit TS1 (which termination resulted as a result of receipt by the terminating office F, of the lock-in verification signal, as will be shown in more detail hereinafter) the trunk signalling unit TS1 signals the signal processor 22 over path 78 of the termination of receipt of the lock-in signal.

(22) The signalling processor 22 in response to such signal (a) transmits a signal over path 80 to the trunk signalling unit TS1 to effect termination of transmission of the lock-in verification signal over the trunk T1; and (b) signals marker or connector processor 20 over path 26 to indicate that transmission is terminated.

(23) The marker in response to such signalling (a) changes the settings of connection memory 36 over path 34, which in turn controls the switching circuit 40 to effect disconnection of the trunk circuit T1, over which the lock-in signal arrived, and specifically disconnects trunk T1 from paths 66, 68 which extends to the trunk signalling unit TS1, and connects the trunk circuit over paths 86, 88 for the line circuit associated with line L1 and the calling end instrument E1; (b) signals the signalling processor which changes the busy marking in the A-memory for line L1 and trunk T1 from search busy (SB) to cut through busy (CB).

(24) After this operation, the scanner 18 begins to monitor for release of the line L1 via the line circuit associated with line L1 and for release of the trunk T1 over its associated trunk circuit, so that release of the equipment used in the connection may be effected as soon as the parties have restored their instruments after the call is finished.

In brief summary, it will be seen that with the dialing of the called address, such as 84466, of an instrument E3 at station F by the user of an end instrument, such as E1 at station A, the equipment will automatically extend or spread the connection over the outgoing paths, such as AB and AE of station A to stations B and E respectively. The call is further spread by such stations in a manner to be described, and at such time as a lock-in signal is received over one of the two paths from the terminating office indicating the arrival of the connection thereat, the equipment will be operative to release the ones of the paths which did not include the lock-in signal, and to establish a connection over the path and trunk over which the lock-in signal was received.

*Release of equipment responsive to restoration of calling line first (local to trunk call)*

The manner in which the equipment is released in the event the calling line releases first is now set forth hereat.

(25) As a calling line releases, the scanner 18 detects the release, and over path 19 notifies marker 20 of the release.

(26) Marker 20 via connection memory 36 and switching circuit 40 (a) effects disconnect of the calling line circuit, associated with line L1, from the called trunk circuit associated with trunk T1, by interrupting the connection extending over paths 86, 88; (b) connects the release conductor 93 to the OUT-portion of the trunk circuit T1 which was used in the call, whereby the release signal is repeatedly sent out over trunk T1; (c) signals the signalling processor 22 over path 21 indicating that such operation has been effected. The signalling processor removes the cut-thru busy indication for the calling line from the A-memory.

(27) When the equipment of the distant end of the trunk T1 releases, the trunk circuit associated with the trunk T1 marks path 91 to provide a release marking to the scanner 18 as the release verification signal.

(28) Scanner 18 operates to compare the release verification signal with the status of the trunk as marked in the status memory 17, and in such comparison detects the existence of the release verification signal on path 91. Scanner 18 over path 19 notifies marker 20 of the detection of such signal.

(29) Marker 20 through connection memory 36, controls switching circuit 40 to effect disconnection of the release conductor 93 from the trunk circuit associated with trunk T1, and over path 21 notifies the signalling processor 22 of such disconnect.

(30) Signal processor 22 in response thereto over path 23 removes the marking from the "cut-thru" busy register for trunk T1 in the A memory 24, whereby the trunk will appear as idle to the other equipment in the office.

*Release of equipment responsive to release of trunk first (local to trunk call)*

(31) In the event that the outgoing trunk T1 used in the call releases before the calling party restores, the scanner 18 (a) signals the marker 20 over path 19 of such release.

(32) Marker 20 in response to such signal is operative with the connection memory 36 and switching circuit 40 to (a) disconnect the calling line circuit associated with calling line L1 in the present example, from the called trunk circuit associated with trunk T1, in the present example, by interrupting the paths extending over 86, 88 therebetween; (b) connects the calling line circuit for line L1 over the switching circuit 40 to the busy conductor 95 associated with supervisory signal generator 42; (c) connects the OUT-portion of the trunk circuit for trunk T1 to the release conductor 93 associated with signal generator 42 for a short time interval, whereby the release signal passes over the OUT-portion of trunk circuit associated with trunk T1 and path 16 as the release verification signal to the trunk equipment at the other end of the connection; (d) over path 21 signals the signalling processor 22 of the transmission of the release signal.

(33) Signalling processor 22 is operative responsive to such signalling to (a) control erasure of the called address (84466 in the present example) from the B memory register 56 over path 55; (b) effect removal over path 55 of the marking on the cut-thru busy register in the B memory 56 for the trunk T1 which was used in the call, to thereby indicate the trunk as idle to the other equipment in the office.

(34) When the calling line L1 releases, the scanner 18 in its scanning operation, detects the on-hook condition in the manner described heretofore, and over path 19 notifies the marker 20 of such condition.

(35) Marker 20 responsively operates and (a) effects interruption of the connection from the calling line circuit for line L1 to the busy lead 95 by the switching circuit 40; (b) over path 21 notifies the signalling processor 22 of such operation.

(36) Signalling processor 22 over path 23 responsively removes the marking on the cut-thru busy register associated with the calling line L1 in the A memory 24.

*Call to the same address found in progress (collision)*

In the foregoing example, the manner of operation of the switching equipment in spreading a call from a local station over a plurality of outgoing trunks was set forth in detail. As indicated during the progress of the call, the equipment was operative to check the B memory 56 of the equipment in the calling office A for the purpose of determining if there was another call to the same called address (84466) in progress at the time. In the example set forth above, it was assumed that there was no other call registered in the B memory 56 to the same called address and accordingly the processing of the call continued in accordance with the established pattern.

It is now assumed, for purposes of explanation, that another call is in progress to the same called address 84466. As noted above, in such event the called address number in the present example will be found in one of the register sets in the B memory 56 by the signalling processor 22.

(1) As a result of the detection of the same address (line) in the B memory 56, the signalling processor 22 (a) effects interruption of the connection 29 between the line signalling unit 30 and the input conductor 53 to the scratch pad memory 52, and erases the called address number 84466 from register SP1 in the scratch pad memory 52; (b) over path 26 notifies the marker 20 of such operation.

(2) Marker 20 is operative (a) with connection memory 36 to control switching circuit 40 to interrupt the paths 41, 43 which extend between the line circuit for line L1 and the line signalling unit 30; (b) to connect the line circuit for the line L1 to the busy conductor 95 on the supervisory signal generator 42.

(3) As the calling line L1 releases, path 13 to scanner 18 is marked, and the scanner 18 detects such release and over path 19 notifies marker 20 of such release.

(4) Marker 20 operates responsively and (a) with connection memory 36, controls switching circuit 40 to interrupt the connection over the switching circuit 40 between the line circuit for line L1 and the busy conductor 95; (b) over path 21 notifies signalling processor 22 of termination of the busy signal transmission.

(5) Signalling processor 22 over conductor 23 responsively removes the marking from the search-busy register SB for the calling line L1 in the A memory 24, whereby the line L1 now appears idle to the other equipment in the office.

*All outgoing trunks busy (local to trunk call)*

In the example set forth hereinbefore in which a call initiated by the end instrument E1 at office A was spread over outgoing trunks, such as AE, AB, to other offices in the system in the search for the desired end instrument E3 having address 84466, it was assumed that an idle trunk was available for spreading the call in such manner.

It is now assumed that each of the outgoing trunks at office A is busy, and the following description sets forth the manner in which the equipment operates in response to the detection of the busy condition.

(1) In the tracing of the call in the example set forth hereinabove, it will be recalled that the signalling processor 22 over path 55 placed the called address (84466 in the present example) in the B memory 56 opposite the calling address (23614 in the present example) in the L1 column of the A memory 24, and by reference to the A memory, the signal processor 22 operates to search for an idle trunk in each outgoing route (i.e., in the previous example T1 in route AE was found idle).

However, if the processor 22 is not able to find an idle trunk, such as T1, 2T1, etc., in any other outgoing routes, signalling processor 22 (a) effects interruption of the connection 29 between the line signalling unit 30 and the input path 53 to the scratch pad memory 52 and (b) erases the called address (84466 in the present example) from the register SP1 in the scratch pad memory, and also from the register L1 in the B memory 56; (c) notifies the marker 20 over path 26 of such operation.

(2) The sequence of operation of the system thereafter is essentially the same as the outline above.

This condition is more simply expressed in the showing of FIGURE 1J in whcih the legends and the arrows thereshown indicate the manner in which with all outgoing paths busy, the incoming path is released.

*Release by calling line prior to return of lock-in or release signal over outgoing truck (local to trunk call)*

In the description of the call that was being spread from station E1 to station E3 or E4 above, examples were given of the operation of the system responsive to the receipt of a lock-in signal over a trunk (T1 in such example).

(1) In the event that the calling line releases before the lock-in signal is received or before a release signal is received back over any outgoing trunk the scanner 18 notifies the marker 20 of such release over a path 19.

(2) The marker 20 is responsively operative (a) with connection memory 36 and switching circuit 40 to transfer the selected ones of the trunk signalling units, such as TS1, from the selected address regenerator, such as AR1, to the release conductor 93, whereby the release signal is repeatedly sent out over such trunks; (b) to notify the signalling processor of such operation over path 21; (c) with connection memory 36 to control the switching circuit 40 to disconnect the line circuit for the calling line L1 from the line signalling unit 30 by interrupting the paths 41, 43.

(3) Signalling processor 22 operates and (a) over path 55 effects erasure of the called address 84466 from the register L1 in the B memory 56; (b) and removes the busy marking from the search busy register SB for line 1 in the A memory 24.

(4) As the release verification signal is received back over each trunk, such as T1, the trunk is disconnected from the trunk signalling unit, such as TS1, which is disconnected from the release conductor 93, and the signalling processor 22 erases the SB busy indication for the corresponding trunk, such as T1, in the trunk address in the A memory 24.

*Operation of equipment at an office with failure of receipt of a lock-in signal and responsive to receipt of a release signal over all outgoing paths (FIGURE 1K) (local to trunk call)*

In the example in which the spreading of a call from the station E1 over the system for the station E3 as described earlier herein, the operation of the system in response to a lock-in signal was set forth in detail. At this time, the description sets forth the manner of operation in the event that no lock-in signal is received, and a release signal is received over all of the outgoing trunks. The resultant operation is represented in the basic schematic showing of FIGURE 1K.

In order to simplify the description, reference is made first to the operation of the system as the release signal is received over one of the trunks, and thereafter the manner in which the system is operative as the release signal has been received over all of the outgoing trunks.

Assuming now that the release signal is received over the trunk T1, the trunk signalling unit TS1 connected thereto over path 66, detects the release signal and in turn over path 78 notifies the signalling processor 22.

(1) The signalling processor 22 is responsively operative to (a) notify the marker 20 over path 26; and (b) over path 55 erase the called address in register T1 in the B memory 56.

(2) Marker 20 operates and through connection memory 36 controls switching circuitry 40 (a) to effect disconnection of the trunk signalling unit TS1 from the address regenerator AR1 by interruption of path 90; (b) to connect the trunk signalling unit TS1 to the release conductor 46 of the signal generator 42, whereby the release signal is repeatedly sent back over the trunk signalling unit OUT-portion of path 68, and the OUT-portion of the trunk circuit for trunk T1 as the release verification signal.

(3) Upon termination of the release signal from the distant end, the trunk signalling unit TS1 over path 78 notifies the signal processor 22, and signal processor 22 over path 80 notifies TS1 to cease passing the release signal for conductor 46 and over path 26 notifies the marker 20.

(4) Marker 20 operates and (a) with memory 36, controls switching circuit 40 to disconnect the trunk signalling unit TS1 from the trunk circuit associated with trunk circuit T1 by interrupting paths 66, 68; (b) notifies the signalling processor 22 over path 21.

(5) Signalling processor 22 is operative thereupon to remove the busy marking from the trunk address T1 in the A memory 24, thus making the trunk available to the other equipment in any office for use in another call.

(6) Assuming now that the release signal is received over all trunks associated with the call, the trunks and the associated trunk signalling units will be released individually, as explained above.

(7) When the signalling processor 22 detects that the last trunk of the group of trunks has been released (a) it notifies marker 20 of such fact over path 26; (b) over conductor 53 erases the called address (84466 in the present example), from called address register SP1 in scratch pad memory 52; (c) over conductor 55 erases the called address from the register L1 in the B memory 56 as located opposite the calling address, 23614 in the present example, for line L1 in the A memory 24.

(8) Marker 20 operates responsively and connects the line circuit for the calling line L1 to the busy conductor 95.

(9) When the calling line releases, the marking on path 13 is detected by scanner 18 in its normal scan and the scanner 18 over path 19 notifies the marker 20 of the release.

(10) Marker 20 responsively (a) disconnects the line circuit for the calling line L1 from the busy lead 95 and (b) notifies the signalling processor 22 over conductor 21 of the disconnect.

(11) Signalling processor 22 over path 23 removes the busy marking from the search busy register SB for the calling address for line L1 in the A memory 24.

*Trunk-to-trunk call (FIGURE 3)*

In the exemplary call described hereinbefore in which a call from an instrument E1 at office A for an instrument E3 in office F was spread over the system, the progress of the call was set forth to the point where the trunks such as T1 in path AE, and trunk 2T1 in path AB were seized and operated. In describing such operation reference was made to the return of certain signals from the distant equipment in the event certain conditions existed at the distance offices. The following description now sets forth the manner in which the equipment at a distant office, such as office E, is operative responsive to the signals received over a path, such as AE, from office A.

In that the equipment at the offices A, E, etc., are similar in most respects, the only new identification numerals appearing in FIGURE 3 are those which identify the connections which differ as a result of the manner of operation in the processing of the call through the office from an incoming trunk (T1 in the present example) to an outgoing trunk 2T1 in the present example. Other numerals are similar to those used in FIGURE 2 for like equipment.

As the signals are received over the IN-portion of incoming trunk T1 (FIGURE 3) in path AE which extends from office A (FIGURE 2) to office E (FIGURE 3), the trunk circuit for trunk T1 effects marking of conductor 91, and the scanner 18 at office E is operative in the manner heretofore described to detect the seized condition of trunk T1.

Scanner 18 operates and over path 19 signals the marker 20 of the trunk seizure.

Marker 20 operates and (a) over path 21 determines the status of the trunk signalling units 60 from the signalling processor 22 and assigns a particular signalling unit, such as TS1, if available, to the calling trunk circuit which, in the present example, is trunk T1 for path AE; (b) with connection memory 36 controls the switching network 40 to connect the calling trunk T1 and its associated trunk circuit over conductors 92, 94 to the trunk signalling unit TS1 which has been assigned thereto for the purpose of the call; (c) notifies the signalling processor over path 21 of the call.

Signalling processor 22 operates and (a) over path 23 marks the calling trunk T1 busy in the A memory home address 24 by marking the search busy register SB therefor busy; and (b) connects the IN-portion of the assigned trunk signalling unit TS1 over paths 78, 93 to the scratch pad memory 52; (c) over path 80 signals the trunk signalling unit TS1 to extend the seize signal over conductor 50 and the OUT-portion of the trunk signalling unit TS1 and path 94, the OUT-portion of the trunk circuit for trunk T1 and path AE to the office A, which signal in effect operates as the seized acknowledge signal to office A. At office A, the seize or acknowledge signal effects operation of the selected address regenerator, such as AR1 thereat, to forward the called address 84466 over the calling trunk T1 in path AE to office E (such operation having been described hereinbefore), the address being transmitted one digit at a time (which may be in the bit form, if desired).

The called address is received over trunk T1 and extended over the IN-portion of the associated trunk circuit and path 92 to the IN-portion of the trunk signalling unit TS1, and path 78 to the signalling processor 22 for processing therein. Signal processor 22 forwards the called address over path 53 to the scratch pad memory 52 which accumulates the called address in an idle call address register, such as SP1.

Signalling processor 22 operates and over path 23 controls comparison of the called address (84466 in the present example), with the addresses registered in the A memory 24 and B memory 56. In that the station E3 having the called address 84466 is in office F, it will be apparent that the address will not be found in the A memory at office E, and as a result the equipment 22 determines that the call is to be extended to an outgoing trunk and not to a local station.

For purposes of this example, it is assumed that no other call to the same address is in progress to office E, and accordingly the called address will also not be found in B memory 56.

Signal processor 22 therefore places the called address in the one of the register sets in the B memory 56 which is opposite the address of the calling trunk in A memory 24 (T1 in the present example).

The signalling processor also, by reference to the A memory 24, selects an idle trunk in each outgoing route, such as illustrated outgoing routes EF, EI (except the route which contains the calling trunk—route AE which includes calling trunk T1 in the present example). The signalling processor 22 via path 55 places the called address in the B memory 56 in the ones of the register sets opposite the selected trunk addresses in the A memory 24, of the selected trunks, for example, 2T1 and LT1. Signal processor 22 thereupon signals the marker 20 as to the status of all the trunk signalling units 60 and the address regenerators 62. Marker 20 with connection memory 36, controls switching circuit 40 (a) to connect the selected ones of the trunk circuit, such as 2T1 for path AB, LT1 for path EI, each to a different idle trunk signalling unit, such as TS2, TS3; (b) notifies the signalling processor 22 over path 21 as to which of the address regenerators 62 and trunk signalling units 60 were selected.

Signalling processor 22 responsively (a) connects the set of called address registers, such as SP1, which contain the called address in the scratch pad memory 52 to the selected address regenerator, such as AR1, whereby the called address is available to be sent via the selected trunk signal units, such as TS2, TS3, out over the selected channels, such as 2T1, LT1; (b) signals each of the selected trunk signalling units, such as TS2, TS3, over paths, such as 84, to pass the seize signal which is repeatedly issuing from the supervisory signal generator 42 over conductor 50 to the OUT-portion of the switching units TS2, TS3, for example, and over path 102 and path 106 to the OUT-portion of the trunk circuits for the selected trunks, such as 2T1, LT1 in paths EF and EI respectively.

As the seize signal is received back as the seizure acknowledge signal from the next office over the IN-portion of the trunk circuit for the trunks 2T1, LT1 and is extended over paths 100, 104 respectively, to the IN-portion of the trunk signalling units TS2, TS3, the trunk signalling units in turn signal the signalling processor 22 over paths 82, 82′, which in turn signal the marker 20 of the receipt of the seize signals at office E.

Marker 20 operates and (a) with connection memory 36, and switching circuit 40 connects the selected one of the address regenerators 62, which in the present example has been assumed to be regenerator AR1, to the trunk signalling units TS2, TS3 over which the sieze acknowledge signal was received. It should be noted that the marker is operative to connect each trunk to the address regenerator at the time the seize acknowledge signal is received over the trunk.

It will be recalled that in the present description of the operation of office E, the calling line L1 is located at office A and that the office A is transmitting the called address repeatedly over its outgoing trunks, one of which includes trunk T1 in the path AE which extends to the office E. It is further recalled that it is a purpose of office E upon determining that the called address is not a local station to further spread the call over each of its outgoing paths to other offices (offices E and I in the present example).

Each time the called address is received over path AE, trunk T1 and its associated trunk circuit, path 92 and the trunk signalling unit TS1, the signalling processor 22 is operated over path 78 to place the received called address in the scratch pad memory 52 over path 53 and to control the address regenerator (AR1 in the present example) to forward the called address as registered in the scratch pad memory 52 over ouput path 90 to the OUT-portion of each of trunk signalling uints TS2, TS3, and over paths 102, 106, respectively, to trunk circuits associated with trunks 2T1, LT1, in paths EF and EI, respectively. Each time the called address is thus forwarded over the outgoing trunks 2T1, LT1, the called address is erased from the scratch pad memory 52. As a result, as the called address ceases to be received over the incoming trunk T1 in path AE, the equipment at office E will automaticaly terminate the transmission over its outgoing paths, such as EF and EI.

If the seize acknowledge signal is not received back over a given trunk, such as 2T1, LT1, signalling processor 22 signals the marker 20 which via connection memory 36 and switching circuit 40 disconnects the ones of the trunk circuits which did not receive the seize acknowledge signal from their associated trunk signalling units, and the inoperable trunk or trunks are placed on lockout.

While the called address is being forwarded over the outgoing trunks 2T1 and LT1, the trunk signalling unit TS1 is monitoring the calling trunk T1 for the release signal; and the trunk signaling units TS2, TS3 are monitoring the called trunks 2T1 and LT1 for the lock-in signal or the release signal.

If the lock-in signal is received back over the IN-part of the trunk circuit for the outgoing trunk 2T1, the signal is transmitted over path 100 to the IN-part of the trunk signalling unit TS2 which in turn effects transmission of a signal over conductor path 82 to the signalling processor 22 which over path 53 (a) erases the caller number, such as 84466 from the scratch pad memory 52 and disconnects the scratch pad memory 52; (b) signals all outgoing trunk signalling units (in the given example, TS3) associated with the call (except the trunk signalling unit TS2 which received the lock-in signal) to pass the release signal provided by supervisory signal generator 42 over path 46 in a repeated manner over the OUT-portion thereof. This comprises the path 106 and the OUT-portion of the trunk circuit LT1; (c) signals the marker 20 over path 26.

As a result of receiving the signal from the signal processor 22, the marker 20 disconnects the address regenerator, such as AR1, involved in the call from the outgoing trunk signalling units, such as TS2 and TS3, which were involved in the call.

As the result of the receipt of the release signal back over any trunk as a release vertification signal, the associated trunk signalling unit, such as TS3, transmits a signal over associated path, such as 82' to the signalling processor 22.

The signalling processor 22 in response to such signal (a) erases the called address, such as 84466 in the present example, which is registered opposite such trunk (trunk LT1 in the present example) in the B memory 56 (see FIGURE 5); (b) signals the trunk signalling unit TS3 to cease transmission of the release signal from generator 42 and conductor 46 over path 106 and the associated trunk LT1 (c) transmits a signal over paths 26 to the marker 20.

The marker 20 in response to such signal (a) disconnects the trunk signalling unit, such as TS3 over which release verification is received from its associated trunk circuit, such as LT1, etc., with which it was used during the spread of the call; (b) transmits a signal over conductor 21 to the signal processor 22.

The signal processor 22 transmits a signal over path 23 to the A-memory home address circuit 24 to remove the marking from the search busy register SB in the A memory 24 which indicates that the trunk LT1 was in use, making the trunk available for a new call.

When the signalling processor 22 is signalled that the release verification signal is received back over all outgoing trunks handling the call (except the outgoing trunk which received the lock-in signal), (i.e., over trunk LT1), (a) it changes the busy marking for the calling and called trunks T1 and 2T1 in the A-memory from search busy to cut-through busy; (b) signals the marker 20.

The marker 20 in response to such signal (a) transmits a signal over path 34 to connection memory 36 which in turn signals over path 38 to the switching circuit 40 which (a) disconnects the trunk signalling units TS1 and TS2 from the trunk circuits associated with the calling and called trunks T1 and 2T1; (b) connects the calling trunk T1 with the trunk 2T1 over which the lock-in signal was received whereby the lock-in signal is repeatedly sent over this connection to the prior office.

Thereupon the scanner 18 monitors the calling and called trunks for release.

*Release of equipment responsive to restoration of calling trunk first (trunk to trunk call)*

The manner in which the equipment is released in the event the calling trunk is released first is now set forth.

As a calling trunk T1 releases, the scanner 18 detects the release and over path 19 notifies marker 20 of the release.

Marker 20 (a) via path 34 marks the connection memory 36 which over path 38 marks the switching circuit 40 which disconnects the calling and called trunks T1 and 2T1; (b) connects the release conductor 93 to the OUT-portion of both calling and called trunks T1 and 2T1, whereby the release signal is repeatedly sent out over the trunks, the signal over trunk T1 being a timed release signal constituting a release verification signal and the signal over trunk 2T1 constituting the release signal, (c) transmits a signal over path 21 to the signalling processor 22 indicating that such operation has been effected.

The signalling processor 22 erases the called address from the B-memory opposite the trunks T1 and 2T1 and removes the cut-through busy from the CB register of trunk T1 in the A-memory.

When the distant end of trunk 2T1 releases, the OUT-portion of the trunk circuit associated with trunk 2T1 marks the path 91', providing a release marking to the scanner as the release verification signal.

Scanner 18 operates to compare the release verification signal with the status of the trunk as marked in the status memory 17, and in such comparison detects the existence of the release verification signal on path 91'. Scanner 18 over path 19 notifies marker 20 of the detection of such signal.

The marker 20 through connection memory 36, controls switching circuit 40 to effect disconnection of the trunk circuit associated with trunk 2T1 from its connection to the release conductor 93 and over path 21 notifies the signalling processor 22 of such operation.

Signal processor 22 in response thereto, over path 23, removes the marking from the "cut-thru" busy register for trunk 2T1 in the A-memory 24, whereby the trunk will appear as idle to the office.

In the event that the outgoing trunk 2T1 used in the call release first, the scanner 18 signals the marker 20 over path 19 and the functioning of the equipment is similar to that set forth hereinabove.

*Call in progress to the same address-collision (trunk to trunk call)*

In the foregoing example, the manner of operation of the switching equipment in spreading a call from an incoming trunk over a plurality of outgoing trunks was set forth in detail. As indicated during the progress of the call, the equipment was operative to check the B memory 56 in the office E for the purpose of determining if there was another call to the same called address in progress at the time. In the example set forth above, it was assumed that there was no other call registered in the B memory 56 to the same called address (84466) and accordingly the processing of the call continued in accordance with the established pattern.

It is now assumed, for purposes of explanation, that another call is in progress to the same called address. As noted above, in such event the called address number in the present example will be found in the registers in the B memory 56 associated with another line or trunk by the signalling processor 22.

(1) As a result of the detection of the same address (line) in the B memory 56, the signalling processor 22 determines that another call to the same address (line) is in progress and (a) disconnects the trunk signalling unit TS1 from the scratch pad memory 52 and erases the scratch pad memory 52; (b) signals the trunk signalling unit TS1 to pass the release signal from conductor 46 via the OUT-portion of the trunk signalling unit TS1, etc. whereby the release signal is repeatedly sent over the calling trunk T1.

(2) When the release signal is received back over the calling trunk T1 as the release verification signal, the trunk signalling unit TS1 takes cognizance thereof and signals the signalling processor 22.

(3) The signalling processor 22 (a) signals the trunk signalling unit to cease passing the release signals to the calling trunk T1; and (b) signals the marker 20.

(4) The marker 20 (a) via the connecting memory 36 and switching network 40 disconnects the trunk signalling unit TS1 from the calling trunk T1; and (b) notifies the signalling processor 22 of the disconnect.

(5) The signalling processor 22 removes the busy from the calling trunk address in the A memory 24, whereby the trunk T1 is once more available for use in other calls.

*All outgoing trunks busy (trunk to trunk call)*

In the example set forth hereinbefore in which an incoming trunk call from office A and route AE was spread over outgoing trunks, such as EI, EF, to other offices in the system in the search for the desired end instrument E3 having address 84466, it was assumed that an idle trunk was available for spreading the call in such manner.

It is now assumed that each of the outgoing trunks at office E is busy, and the following description sets forth the manner in which the equipment operates in response to the detection of the busy condition.

(1) In the tracing of a trunk to trunk call in the example set forth hereinbefore, it will be recalled that the signalling processor 22 over path 55 placed the called address (84466 in the present example) in the B memory 56 opposite the calling trunk designator (such as 124) in the T1 column of the A memory 24, and by reference to the A memory, the signal processor 22 operated to search for an idle trunk in each outgoing route (i.e., in the previous example 2T1 and LT1 in routes EF and EI were found idle).

However, if the processor 22 is not able to find an idle trunk, such as 2T1, LT1, etc., in any other outgoing routes, signalling processor 22 (a) disconnects the trunk signalling unit TS1 from the scratch pad memory 52; (b) erases the scratch pad memory 52; (c) erases the called address from the B memory 56; (d) signals the trunk signalling unit TS1 to pass the release signal from conductor 46 via the OUT-portion of the trunk signalling unit, etc., whereby the release signal is repeatedly sent over the calling trunk T1.

(2) When the release signal is received back over the calling trunk T1 as the release verification signal, the trunk signalling unit TS1 takes cognizance thereof and signals the signalling processor 22 of the signal receipt.

(3) The signalling processor 22 (a) signals the trunk signalling unit TS1 to cease passing the release signal; (b) signals the marker 20 of such operation.

(4) The marker 20 (a) effects the disconnection of the trunk circuit T1 from the trunk signalling unit TS1; (b) notifies the signalling processor 22 of its operation.

(5) The signalling processor 22 removes the SB busy for the calling trunk in the A-memory.

*Release by incoming trunk prior to return of lock-in or release signal over outgoing trunk (trunk to trunk call)*

In the description of the call that was being spread from incoming trunk T1 to outgoing trunks 2T1, LT1, above, examples were given of the operation of the system responsive to the receipt of a lock-in signal over a trunk (2T1 in the example). In the event that the incoming trunk T1 releases before the lock-in signal is received (or before a release signal is received back over outgoing trunk LT1, for example) the trunk signalling unit such as TS1 is operative to notify the signalling processor 22 which signals the marker 20.

(1) The marker 20 (a) via the connection memory 36 and switching network 40 disconnects the calling trunk circuit T1 from the associated trunk signalling unit TS1; (b) notifies the signalling processor 22 of such disconnect.

(2) The signalling processor 22 (a) erases the called address from the B memory 56; (b) removes the busy from the calling trunk address in the A memory 24; (c) signals the trunk signalling units TS2, TS3, associated with the called trunks 2T1, LT1 to pass the release signal out over the trunks 2T1, LT1.

(3) As the release verification signal is received back over each called trunk 2T1, LT1, the trunk is disconnected from its trunk signalling unit TS2, TS3, and the signalling processor 22 erases the busy indication at the trunk address in the A memory 24.

*Operation of equipment at an office with failure of receipt of a lock-in signal and responsive to receipt of a release signal over all outgoing paths (FIGURE 1K—trunk to trunk call)*

In the example in which the spreading of a call from the office E over the paths EF, EI which was described earlier herein, the operation of the system in response to the return of a lock-in signal from the called address was set forth. It is now assumed that no lockin signal is received, and that a release signal is received over all of the outgoing trunks (trunks 2T1 and LT1 in this example). The resultant operation is represented in the basic schematic showing of FIGURE 1K.

In order to simplify the description, reference is made first to the operation of the system as the release signal is received over one of the trunks, and thereafter the manner in which the system is operative as the release signal has been received over all of the outgoing trunks.

(1) When the release signal is received over trunk 2T1, trunk signalling unit TS2 connected thereto takes cognizance thereof and notifies the signalling processor 22 of the release signal receipt.

(2) The signalling processor 22 responsively (a) erases the called address in the B memory 56 associated with trunk 2T1 in the A memory 24; (b) signals TS2 over path 34 to pass the release signal from conductor 46 out over trunk 2T1; (c) notifies the marker 20 of such operation.

(3) The marker 20 responsively disconnects trunk signalling unit TS2 from the address regenerator AR1.

(4) Upon cessation of the release signal over trunk 2T1 from the distant end, trunk signalling unit TS2 notifies the signalling processor 22 of the release signal termination.

(5) The signalling processor responsively (a) signals trunk signalling unit TS2 to discontinue forwarding of the release verification signal over the trunk 2T2; (b) notifies the marker 20.

(6) The marker 20 responsively (a) via the connection memory 36 and switching network 40 effects the disconnection of the trunk 2T1 from the trunk signalling unit TS2; (b) notifies the signalling processor 22 of the disconnect.

(7) The signalling processor 22 moves the SB busy from the address of the trunk 2T1 in the A-memory 24, making the trunk 2T1 available for another call.

(8) When the release signal is received over trunk LT1, the operation is similar, and is therefore not repeated.

(9) The signalling processor 22 becomes aware that the last outgoing trunk (2T1, LT1) associated with the call has been released.

(10) The signalling processor 22 (a) signals trunk signalling unit TS1 to pass the release signal from conductor 46 out over the calling trunk T1; (b) erases the scratch pad memory 52; (c) disconnects the scratch pad memory 52 from the address regenerator AR1; (d) erases the called address in the B-memory 56 associated with the calling trunk T1 (in the A-memory 24).

(11) When the release signal is received back over the calling trunk T1 as the release verification signal, trunk signalling unit TS1 takes cognizance thereof and notifies the signalling processor 22 of the signal receipt.

(12) The signalling processor 22 (a) notifies the marker 20; and (b) signals trunk signalling unit TS1 to discontinue forwarding of the release signal.

(13) The marker 20 (a) disconnects the trunk circuit of trunk T1 from the trunk signalling unit TS1; (b) notifies the signalling processor 22 of disconnect.

(14) The signalling processor 22 removes the SB busy from the address of the calling trunk T1 in the A-memory 24, whereby the trunk circuit is made available for use in other calls.

*Trunk to local calls (FIGURE 4)*

Referring now to FIGURE 4, it is now assumed that a trunk, such as 2T1, is seized over the distant end causing the trunk 2T1 to change its marking to the seize condition on the path 91′ to the scanner 18.

The scanner 18 in its continuous scanning operation detects the seize condition of the trunk 2T1 and, by processes already described under trunk to trunk call, the calling trunk 2T1 becomes connected to an idle trunk signalling unit, such as TS1, and transmits the called address 84466 as received over path 78 to the signalling processor 22 which accumulates the address in the scratch pad memory 52.

(1) The signalling processor 22 (a) compares the called address in the scratch pad memory 52 with the addresses in the A-memory 24 and B-memory 56 (I) finding the called address in the A-memory 24, the signalling processor 22 determines that the call is to a local line having thereon a station which may be end instrument E3. It is assumed at this time that the signalling processor 22 does not find the called address busy (SB or CB) in the A-memory 24. (II) It is further assumed that no other call to the same address is in progress in the office and the called address is not in the B-memory; (b) places the called address 84466 in the B-memory 56 in the called registers associated with the calling trunk designation 125 in the A-memory 24 (trunk 2T1); (c) marks the calling trunk designation 125 as in the search busy condition in the A-memory 24; (d) marks the called address 84466 as in the search busy condition in the A-memory 24; (d) signals the trunk signalling unit TS1 to pass the lock-in signal which is a continuously repeating signal from conductor 48 out over the OUT-portion of the incoming trunk 2T1. This transmission of the repeating lock-in signal continues and is passed backward through the intervening offices, such as office E (FIGURE 3), as the offices "cut-through" until it reaches the calling office, such as office A (FIGURE 2). As the lock-in signal is received in the intervening offices redundant outgoing trunks associated therewith become released, as noted in the earlier description.

(2) Thereupon the calling office (A) sends the lock-in verification signal over the established path in the manner described earlier and in the present instance the signal arrives at the IN-portion of trunk 2T1 and passes through the switching network 40 to the trunk signalling unit TS1 which sends a signal to the signalling processor 22 that the lock-in verification signal has been received.

(3) The signalling processor responsively signals the trunk signalling unit TS1 to discontinue the forwarding of the lock-in signal. When the originating office (A) detects that the lock-in signal has ceased, it discontinues the lock-in verification signal and ceases the forwarding of the called address, thus stopping the spread of the call in the saturation signalling network.

(4) When the trunk signalling unit TS1 detects the cessation of the lock-in verification signal, it signs signalling processor 22 of the termination.

(5) The signalling process or 22 signals the marker 20 that the lock-in verification has been received.

(6) The marker 20 responsively (a) via the connection memory 36 and switching network 40 (I) effects the disconnection of the trunk signalling unit TS1 from the trunk circuit for trunk 2T1 over conductors 110, 112; (II) connects the OUT-portion of the line circuit for line L1, which is assumed in this example to be the called line, to the ring conductor 97 whereby the called station E3 is signalled; (III) connects the OUT-portion of trunk 2T1 to the ring-back conductor 99 whereby the ring-back signal is passed over the trunk 2T1 to notify the calling station E1 that the called station E3 is being signalled (rung).

(7) The scanner 18 at office F monitors the called line L1 for answer by station E3.

(8) When the called line L1 answers (E3 goes "off-hook") the scanner 18 detects such condition over path 13 and notifies the marker 20.

(9) The marker 20 via the connection memory 36 and switching network 40 (a) disconnects the line circuit of the called line L1 from the ring lead 97; (b) disconnects the trunk circuit of trunk 2T1 from the ring-back lead 99; and (c) connects the trunk 2T1 over paths 114, 116 with the line L1 such that the IN-portion of the trunk 2T1 is connected or associated with the OUT-portion of line L1, and the OUT-portion of the trunk 2T1 is connected or associated with the IN-portion of line L1. Communication then follows.

(10) Release occurs in a manner which is similar to that set forth hereinabove.

CALLED ADDRESS BUSY (TRUNK TO LOCAL CALL)

If on a trunk-to-local call the signalling processor 22 finds the called address busy in the A-memory 24, (incidentally it will find the called address in the B-memory 56) after effecting the sending of the lock-in signal because the called address was found in the A-memory and receiving lock-in verification, it (1) Signals the trunk signalling unit TS1 associated with the calling trunk circuit 2T1 to forward the release signal from the release conductor 46 over the calling trunk 2T1, which signal is received simultaneously for a timed interval by the trunk circuits in all preceding offices because the offices have been cut-thru. Nothing happens in these offices in response to the release signal unless the office receives this signal for a predetermined timed interval. Each originating or tandem office sends the release verification signal over the trunk by which it received the release signal. Each tandem office resends the release signal over the originating trunk which handled the call.

Referring to FIG. 4, the release signal from release conductor 46 passes over the OUT portion of TS1, over the OUT portion of the trunk circuit associated with trunk 2T1, thence in FIG. 3 over the IN portion of the trunk circuit associated with trunk circuit 2T1 therein, over the OUT portion of the trunk circuit associated with trunk T1 therein, thence in FIG. 2 to the IN portion of the trunk circuit associated with trunk T1 therein.

The trunk circuit in FIG. 3 associated with trunk 2T1 via path 91 presents the release signal to the scanner. As a result, the office in FIG. 3 disconnects the trunk AE from trunk EF, and connects the release conductor 93 to the OUT portion of each of the trunk circuits associated with trunks 2T1 and T1 (EF and AE).

The trunk circuit in FIG. 2 associated with trunk T1 via path 91 presents the release signal to the scanner. As a result, the office in FIG. 2 disconnects the trunk AE from line L1, connects the release conductor 93 to the OUT portion of the trunk circuit associated with trunk T1 and connects the busy conductor to the OUT portion of the line circuit associated with line L1.

The release verification signal from office (FIG. 2) to the office (FIG. 3) causes the office (FIG. 3) to cease sending the release signal to the office (FIG. 2). The office (FIG. 2) ceases sending the busy signal to line L1 and the release verification signal to office (FIG. 3).

The release verification signal from office (FIG. 3) to the office (FIG. 4) causes the office (FIG. 4) to cease sending the release signal to the office (FIG. 3). The office (FIG. 3) ceases sending the release verification signal to the office (FIG. 4).

Further detail of this type of trunk release involving timed trunk signals can be found in Ser. No. 69,376 filed Nov. 15, 1960.

(2) When the release verification signal is received back over the calling trunk 2T1 in FIG 4, the trunk signalling unit TS1 notifies the signalling processor 22.

(3) The signalling processor 22 (a) signals TS1 to discontinue the release signal and (b) upon cessation of the release signal notifies the marker 20.

(4) The marker 20 (a) disconnects the trunk circuit of the calling trunk 2T1 from the trunk signalling unit TS1; and (b) notifies the signalling processor 22.

(5) The signalling processor 22 responsively removes the search busy (SB) indication from the calling address in the A-memory 24.

NO ANSWER (TRUNK TO LOCAL CALL)

If, as previously described, a call comes in over trunk 2T1 bound for end instrument E3 over called line L1, and the ring signal is sent to E3 and the ring-back signal is sent to trunk 2T1, but the scanner 18 does not detect an answered condition of the called line L1 during a predetermined timed ringing period, at the end of the timed ringing period, the scanner 18 signals the marker 20.

(1) The marker 20 (a) via the connection memory 36 and switching network 40 switches the OUT-portion of the trunk circuit 2T1 from the ring-back conductor 99 to the release conductor 93; (b) signals the signalling processor 22.

(2) The signalling processor (a) removes the busy from the called address in the A-memory; (b) erases the called address from the trunk registers of trunk 2T1 in the B memory.

(3) When the distant end of trunk 2T1 releases, the local IN portion of trunk circuit of 2T1 changes its marking to the scanner 18 to the release condition.

(4) When the scanner 18 detects the released condition of trunk 2T1, it signals the marker 20.

(5) The marker 20 disconnects trunk 2T1 from the release conductor 93, and the trunk is available for use in another call.

GROUP NUMBERS (SUCH AS PBX)

In the system set forth herein, each line of a called group, such as a PBX group of lines, has the same address; see, for example, 23451—FIGURE 5. As described hereinbefore in the spread of calls through the system, with the collision of two calls to the same address, one of the calls is dropped. In the case of calls to a PBX group, however, it is necessary that a number of calls be permitted to continue simultaneously to the same number (23451, for example) and such manner of operation is effected by adding additional identifying digits to the call.

More specifically, calls to the same line group in a PBX may originate at different offices, and accordingly an office designation, such as for example 12, is sent along with the called address to distinguish calls from different offices to the same line group.

Also calls to the same line group may originate in the same office. Therefore, a tag number, such as 07, is also sent along with the called address to distinguish different calls to the same line group from the same office. The total address then appears as follows: 23451–12–07.

The next call to the same line group from office 12 would appear with a different tag number, such as: 23451–12–11.

A call to the same line group from the office having designation 20 might appear as follows: 23451–20–07.

Accordingly, these three calls to address 23451 have distinct identities and can proceed through the system without collision. It is not necessary for the originating office to know how the group numbers are grouped but only that a call is to a group number so that an office designation and tag number can be included with the address sent.

ADDENDA (1) Referring to FIG. 5, each line and trunk has a register designated D (i.e. direction) associated therewith in the A memory which is marked during a call to indicate whether the call is an incoming or outgoing call. On an incoming call, the signaling processor marks this register to indicate an incoming call at the same time that the line or trunk signaling unit is connected to the scratch pad memory. On an outgoing call, the signaling processor marks this register to indicate an outgoing call at the same time that the called address is placed in the B memory for that line or trunk. The marking in this register is erased by the signaling processor at the same time that the busy indication for that line or trunk is completely erased.

(2) In the situation in which the called address is being sent out over outgoing channels, and assuming no lock-in signal is received, but that the release signal is received, over each of the outgoing trunks and the signaling processor causes the trunks to pass the release verification signal causing the release signal to cease, causing the associated trunk signaling unit to signal this fact to the signaling processor which effects the erasure of the called address in the registers associated with this trunk in the B memory—at such time the signaling processor scans or canvasses the B memory to determine whether the called address has been erased from the last outgoing trunk handling the call, outgoing trunks being marked in their D registers as noted above). The signaling processor makes this examination each time the release signal is received back over an outgoing trunk. By this procedure the signaling processor detects when the last outgoing trunk handling the call becomes released and sets in motion procedures to return the busy signal to the calling line or release signal to the calling trunk.

(3) Line signalling units, trunk signalling units, and address regenerators may have register sets in the A-memory kept updated by the signalling processor whereby the signalling processor is enabled to determine which are idle and which are busy.

(4) "Cut-thru" in a pulse code modulation switching circuit 40 involves not metallic loops but in and out code receivers which "talk" to each other.

MODIFICATIONS (1) As a modification of the system illustrated, the seize signal and release signal can be the same signal whereby if a trunk is unable to return the seize signal as the seize acknowledge signal, after a predetermined timed reception by the trunk of the seize signal, the trunk may interpret the repeating seize signal as the release signal.

(2) As another very important modification of the system illustrated, called addresses may include office codes as a part thereof as in conventional telephony practice whereby a called address comprises the office code followed by the station code. With such type system, it is not necessary that station codes be unique to the saturation signalling system; that is, identical station codes can be used in different central offices.

In the manner of implementing such a system, only the office code portion of a called address is transmitted during the saturation signalling search phase of a call. As the called office code comes into a central office, the central office compares the received called office code with its own office code as permanently registered therein to determine whether or not the called station is associated with that office.

If the received office code is the same as the local office code, the office requests the station portion of the code to be forwarded from the originating end and completes the call. If the received office code is different than the local office code, the office forwards the office code over an idle channel if available in each route therefrom, except the route over which the call is received. Collision of calls occurs and redundant calls are released in similar fashion to that as already described.

As further modification, the complete called address can be transmitted during the searching phase and passed along from office to office, with the office code being the basis for spread of the call and the station code being utilized only in the terminating office. Faster establishment of the call results from the first method in which the station code is only forwarded when requested. As an example, such type code might be

| Office Code | Station Code |
|---|---|
| 32– | 41573 |

(3) in a saturation signalling system as described in the modification immediately preceding in which called addresses comprise an office code followed by a station code, the office codes might be assigned from 00–89 for example.

Instead of assigning codes 90–99 as office codes, these codes may be reserved as the preliminary code in place of the office code for mobile stations. If there are only a limited number of mobile stations, 90 may be used for the entire group.

A mobile station has his called address, such as 90–23451 registered in a given office but if the mobile station moves to a different geographical location in the area served by a different office, the mobile station notifies the first office which deletes his address and also notifies the second office which registers his address.

In operation, during the search phase of a call spreading in a saturation signalling network, if an office receives an initial designator 9 it recognizes this as a call to a mobile station and searches in its A-memory to determine whether or not the mobile station as represented by the remaining digits 0–23451 is connected thereto. If it is, the office completes the call thereto. If not, it spreads the call over an idle channel, if available, in each outgoing route from the central office.

(4) It should be understood that local-to-local calls can be handled by the system and central offices of the disclosure.

(5) Each address regenerator can have independent outputs, each of which can be connected individually to a trunk signaling unit, via the switching circuit, whereby when the address regenerator detects that the last trunk has been disconnected therefrom, it can signal this fact to the signaling processor to set in motion procedures to release the incoming trunk or give busy to the calling line.

(6) If at the point of comparing the called address in the scratch pad memory with the called address in the B-memory, the signaling processor discovers that the same address is in the B-memory registers associated with a trunk in the same trunk group as the incoming trunk over which the address in the Scratch Pad Memory arrived, the signaling processor will signal both trunks to pass the release signal out over the trunks to initiate the release of the trunks.

While we have shown and described what we regard to be the preferred embodiment of our invention, it will be appreciated that various changes, rearrangements and modifications may be made therein without departing from the scope of the invention, as defined by the appended claims.

What is claimed is:

1. In an automatic telephone system including saturation signalling equipment, a plurality of offices, each office including control means responsive to receipt of a call to a non-local called address to forward the call over a channel in each route having an idle channel outgoing from said office, and means in said control means in each office including memory means for marking each call in progress in the office, signal processor means including means for checking each call as received against said calls registered in said memory means, trunk signalling means for transmitting a release signal back over the incoming route used for the call to a desired address responsive to the detection of a call for the same address in said memory means, and means in each office responsive to receipt of a release signal over an outgoing route to erase the markings for such route in the call-in-progress memory in its office.

2. In an automatic telephone system including saturation signalling equipment, a plurality of offices, each office including control means responsive to receipt of an incoming call to a non-local called address to forward the call over a trunk in each route which has an idle trunk other than the route carrying said incoming call, and signal processor means in said control means in each office including trunk register means having a first memory means for temporarily registering the called address as received, and call-in-progress memory means for each trunk, the call-in-progress memory means for the trunks selected for use in forwarding the call from said office being operative to register the called address of the call for the period the call is extended over the trunk, and means in said signal processor means for erasing the called address from the ones of the call-in-progress memory means for each of the trunks over which a release signal is received.

3. In an automatic telephone system including saturation signalling equipment, a plurality of offices, each office including control means responsive to receipt of an incoming call to a non-local destination over a channel to forward the call over each route from said office which has an idle channel available other than the route carrying said incoming call, and means in said control means in each office for effecting the transmission of a release signal back over said channel carrying said incoming call responsive to all channels in all routes other than the route carrying the incoming call being busy in said office.

4. In an automatic telephone system including saturation signalling equipment, a plurality of offices, each office including control means having means responsive to receipt of an incoming call to a non-local destination to forward the call over a channel in each route from said office which has an idle channel available, call-in-progress memory means for storing the called address in different register means for the channels selected over the different outgoing routes for use in forwarding the call, means for transmitting a release signal back over the channel in use in the incoming route responsive to detection of all channels in outgoing routes being busy, and means operative responsive to said all-channel busy condition to erase the called address from the call-in-progress memory means.

5. In an automatic telephone system including saturation signalling equipment, a plurality of offices, each office including control means responsive to receipt of an incoming call to a non-local destination over a channel to forward the call over a channel in each route from said office having an idle channel available other than the route over which the call is received, and means in said control means in each office responsive to the receipt of a release signal back over each of said channels in said routes used in forwarding the call to effect release of said channel carrying the incoming call.

6. In an automatic telephone system including saturation signalling equipment, a plurality of offices, each office including means resonsive to receipt of a call to a non-local destination over a channel in an incoming route to forward the call over a channel in each outgoing route from said office which has an idle channel available, means responsive to the receipt of a release signal back over the forwarding channel in an outgoing route to release said channel in the outgoing route, restoration means for restoring said channel in said incoming route to the idle condition, and means for operating said restoration means responsive to the receipt of a release signal over all channels in said outgoing routes used in the forwarding of the call.

7. In an automatic telephone system including saturation signalling equipment, a plurality of offices, control means in each office including means responsive to receipt of a call to a non-local destination over a trunk in an incoming route to forward the call over a trunk in each outgoing route from said office having an idle trunk available, signal processor means in said control means in each office including call-in-progress memory means for each trunk in each route, means for registering the called address in each call-in-progress memory means for each selected trunk used in forwarding the call, and means responsive to the receipt of a release signal back over all of said trunks in the outgoing routes used for the forwarding of the call to erase said called address from said call-in-progress memory means.

8. In an automatic telephone system including saturation signalling equipment, a plurality of offices, each office including control means responsive to receipt of a call to a non-local destination over a trunk of an incoming route to forward the call over a trunk in each outgoing route from said office having an idle trunk available, means in said control means in each office for making busy the trunks in use in the forwarding of a call, each route which has all trunks busy at the time of receipt of the call being excluded from use in forwarding of said call, and means responsive to the receipt of a release signal back over the trunks in the ones of the routes which were used to extend the call to disconnect the trunk in use in said incoming route.

9. In an automatic telephone system including saturation signalling equipment, a plurality of offices A, B, E, F, control means in office A responsive to receipt of a call to a non-local called destination F to forward the call over each of the outgoing routes AB, AE having an idle channel extending from said office A to said offices B, E; means in said offices B, E, for forwarding said call to said office F over each of the routes BF, EF, having an idle channel extending to office E, means in said office F for transmitting a release signal over the one of the routes BF, EF last extended to office F, and means in said control means in one of said offices, at least, operative responsive to the receipt of a release signal over the outgoing trunks which was used to extend the call to return the trunk over which the call is incoming to the idle condition.

10. In an automatic telephone system including saturation signalling equipment, a plurality of offices, control means in each office including means responsive to receipt of a call to a non-local called address to extend the call over a trunk in each outgoing route from said office having an idle trunk available, and means in said control means in each office operative to transmit a release signal back over the channel in a route over which the call is incoming responsive to the detection of a call for the same address registered in said office, said system being operative to forward a call having an unassigned address over a plurality of different routes, at least one of which extends back to the originating station, whereby the originating station effects release of the routes and offices remaining in the connection used to extend the call thereto.

11. A method of extending a call over a network of paths to a called destination comprising the steps of extending the call for a called destination over a trunk in each outgoing route having an idle trunk extending from an office to other offices, registering the called destination of the call at each office as the call is received thereat, checking the registrations at each office receiving the call for a registration of said destination thereat, further forwarding the calls from each office reached in the call forwarding operation until the office having the desired destination is located, and releasing the incoming trunk which was used for the call at each office at which a release signal is received over each of the trunks in the outgoing routes which were used in the call.

12. A method of forwarding a call over a network of paths to a called destination in a saturation signalling mode comprising the steps of extending the call for a called destination over each route from an office having an idle trunk to other offices, registering the called destination at each office as the call is received thereat, checking the registrations at each office for said destination as the call arrives at the office, further forwarding the calls from each office reached in the call forwarding which has at least one idle trunk until the office having the called destination is reached, and transmitting a release signal back over the incoming trunk at an office which was reached by the call whenever all the channels in all of the routes at the office other than the route carrying the incoming call are busy.

13. A method of extending a call over a network of paths to a called destination in a saturation signalling mode comprising the steps of extending a call for a called destination over a trunk in each outgoing route from an office having an idle trunk to other offices, registering the called destination at each office as the call is received thereat, checking the registrations for said called destination at each of said other offices as the call arrives, further forwarding the calls from each subsequent office reached in the call forwarding which has an idle outgoing trunk until the office having the called destination is reached, transmitting a release signal over the incoming trunk for an office carrying the call whenever the trunks in some outgoing routes at the office are busy, and a release signal is received over each trunk carrying the call in the remaining outgoing routes which were used in the forwarding of the call from such office.

14. In an automatic telephone system including saturation signalling equipment, a plurality of offices, each office including control means operative to extend an incoming call which has a non-local called address over a trunk in each outgoing route from said office which has an idle trunk available, signal processor means in said control means including a first means operative responsive to receipt of calls for the same called address over a first and a second incoming trunk, a second means operative responsive to all channels on the outgoing routes in an office being busy, a third means operative responsive to receipt of a release signal over all trunks carrying the call in outgoing routes used in the forwarding of a call, and signal transmitting means for providing a release signal responsive to operation of any one of said first, second and third means.

15. A system as set forth in claim 14 in which said signal transmitting means are operative to provide a release signal responsive to all of the trunks in some of said outgoing routes being in the busy condition at the time of receipt of the incoming call, and the receipt of a release signal over all of the trunks carrying the call in the remaining ones of its outgoing routes.

16. In an automatic telephone system including saturation signalling equipment, a plurality of offices, each office including control means responsive to receipt of a call to a non-local called address to forward the call over a trunk in each outgoing route from said office having an idle trunk available, and means in said control means in each office including a first memory means for registering each called address in a register associated with an extending trunk for each call in progress from said office, different groups of registers in said first memory being used to register calls extended over different trunk groups, a second memory means for registering each called address as received in an incoming call over a trunk, means in said control means comprising signal processor means including means for checking the called address of each call as registered in said second memory means against the called addresses registered in said first memory means, and release means in said control means for releasing the incoming and outgoing trunks involved in a trunk group responsive to the called address in the second memory received as an incoming call over a trunk in a given trunk group being the same as the called address in a register of the same trunk group in said first memory.

No references cited.

KATHLEEN H. CLAFFY, *Primary Examiner.*

WILLIAM C. COOPER, *Examiner.*